US011929012B2

(12) United States Patent
Park et al.

(10) Patent No.: US 11,929,012 B2
(45) Date of Patent: Mar. 12, 2024

(54) DISPLAY MODULE AND DISPLAY APPARATUS HAVING THE SAME

(71) Applicant: SAMSUNG ELECTRONICS CO., LTD., Suwon-si (KR)

(72) Inventors: Sangyoung Park, Suwon-si (KR); Jongsu Oh, Suwon-si (KR); Hoseop Lee, Suwon-si (KR); Tetsuya Shigeta, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/677,529

(22) Filed: Feb. 22, 2022

(65) Prior Publication Data

US 2022/0270544 A1 Aug. 25, 2022

Related U.S. Application Data

(63) Continuation of application No. PCT/KR2022/002184, filed on Feb. 16, 2022.

(30) Foreign Application Priority Data

Feb. 22, 2021 (KR) ........................ 10-2021-0023237
Apr. 13, 2021 (KR) ........................ 10-2021-0047995

(51) Int. Cl.
*G09G 3/32* (2016.01)

(52) U.S. Cl.
CPC ......... *G09G 3/32* (2013.01); *G09G 2300/026* (2013.01); *G09G 2300/0426* (2013.01); *G09G 2330/04* (2013.01)

(58) Field of Classification Search
CPC ...... G09G 3/32; G09G 3/3208; G09G 3/3216; G09G 3/3225; G09G 2300/026;
(Continued)

(56) References Cited

U.S. PATENT DOCUMENTS 8,917,266 B2 12/2014 Park et al.
10,320,186 B2 * 6/2019 Kim .................... G09G 3/2092
(Continued)

FOREIGN PATENT DOCUMENTS

KR 10-2012-0130355 A 12/2012
KR 1971979 B1 * 4/2019 .............. G09G 3/32
(Continued)

OTHER PUBLICATIONS

English Language Machine Translation of KR-1971979 (Year: 2019).*
(Continued)

*Primary Examiner* — Jason M Mandeville
(74) *Attorney, Agent, or Firm* — Sughrue Mion, PLLC

(57) ABSTRACT

A display module and a display apparatus including the same are provided. The display module includes a module substrate; pixels provided on the module substrate; and a micro-pixel controller configured to supply drive currents to the pixels. The micro-pixel controller includes: a first input pad for receiving a power voltage; a second input pad for receiving a data voltage; pixel circuits configured to output the drive currents to the pixels; a control circuit configured to distribute the power voltage and the data voltage to the pixel circuits; a first ESD protection circuit connected to the first input pad and the control circuit through a first voltage line and configured to transmit the power voltage to the control circuit; and a second ESD protection circuit connected to the second input pad and the control circuit through a second voltage line and configured to transmit the data voltage to the control circuit.

14 Claims, 17 Drawing Sheets

(58) Field of Classification Search
CPC ... G09G 2300/0426; G09G 2300/0804; G09G 2330/00; G09G 2330/04
USPC ...................................................... 345/55, 76
See application file for complete search history.

(56) References Cited

U.S. PATENT DOCUMENTS

| | | | | |
|---|---|---|---|---|
| 10,650,737 | B2 | 5/2020 | Vahid Far et al. | |
| 11,056,047 | B2 | 7/2021 | Shigeta et al. | |
| 11,238,818 | B2 | 2/2022 | Kim et al. | |
| 2006/0022601 | A1 * | 2/2006 | Kitazawa | H10K 59/12 315/169.1 |
| 2009/0279008 | A1 * | 11/2009 | Lee | H01L 27/0248 349/40 |
| 2012/0299974 | A1 | 11/2012 | Park et al. | |
| 2016/0210895 | A1 * | 7/2016 | Fan | H02H 9/046 |
| 2018/0191978 | A1 | 7/2018 | Cok et al. | |
| 2018/0226386 | A1 | 8/2018 | Cok | |
| 2019/0304386 | A1 | 10/2019 | Kim et al. | |
| 2020/0111403 | A1 * | 4/2020 | Kim | G09G 3/32 |
| 2020/0265777 | A1 | 8/2020 | Shigeta et al. | |
| 2021/0142748 | A1 | 5/2021 | Kim et al. | |
| 2021/0304670 | A1 | 9/2021 | Shigeta et al. | |

FOREIGN PATENT DOCUMENTS

| | | | |
|---|---|---|---|
| KR | 10-2019-0113535 | A | 10/2019 |
| KR | 10-2020-0101605 | A | 8/2020 |

OTHER PUBLICATIONS

Original Document KR-1971979 (Year: 2019).*
International Search Report dated Jun. 17, 2022 by the Internationa Searching Authority in International Patent Application No. PCT/KR2022/002184.

* cited by examiner

DISPLAY MODULE AND DISPLAY APPARATUS HAVING THE SAME

CROSS-REFERENCE TO RELATED APPLICATION(S)

This application is a by-pass continuation application of International Application No. PCT/KR2022/002184, filed on Feb. 16, 2022, which is based on and claims priority to Korean Patent Application No. 10-2021-0023237, filed on Feb. 22, 2021, and Korean Patent Application No. 10-2021-0047995, filed on Apr. 13, 2021, in the Korean Intellectual Property Office, the disclosures of which are incorporated by reference herein in their entirety.

BACKGROUND

1. Field

The disclosure relates to a display module for implementing an image using an inorganic light-drive signal, and a display apparatus having the same.

2. Background Art

A display apparatus may be classified into an emissive display in which each pixel emits light by itself and a non-emissive display that requires a separate light source.

A liquid crystal display (LCD) is a representative non-emissive display, and requires a backlight unit configured to supply light from the rear of a display panel, a liquid crystal layer configured to serve as a switch to transmit/block light, a color filter configured to change the supplied light to a desired color, and the like. Thus, the LCD is complex in structure and has a limitation in realizing a small thickness.

On the other hand, in the emissive display in which each pixel emits light by itself by including a light-emitting device for each pixel, components such as a backlight unit and a liquid crystal layer are not required and a color filter may also be omitted. Thus, the emissive display is structurally simple and can have a high degree of freedom in design. In addition, the emissive display may realize not only a small thickness, but also an excellent contrast ratio, brightness, and viewing angle.

Among emissive displays, a micro light-emitting diode (LED) display is one of flat panel displays and includes a plurality of LEDs, in which each LED has a size of about 100 micrometers. Compared to the LCD that requires a backlight, the micro-LED display may provide better contrast, response time, and energy efficiency.

Further, the micro-LED, which is an inorganic light-emitting device, has higher brightness, better light emission efficiency, and a longer lifespan compared to an organic light-emitting diode (OLED), which requires a separate encapsulation layer for protecting organic materials.

SUMMARY

Provided are a display module and a display apparatus in which various circuits configured to drive an inorganic light emitting device are provided in a separate chip so that circuit testing and replacement and a manufacturing process of the display module or the display apparatus including the display module may be more easily performed.

In accordance with an aspect of the disclosure, there is provided a display module including: a module substrate; a plurality of pixels provided on the module substrate; and a micro-pixel controller provided between the plurality of pixels and configured to supply drive currents to the plurality of pixels. The micro-pixel controller includes: a first input pad to which a power voltage is input; a second input pad to which a data voltage is input; a plurality of pixel circuits configured to output the drive currents to be supplied to the plurality of pixels; a control circuit configured to distribute the power voltage input to the first input pad and the data voltage input to the second input pad to the plurality of pixel circuits; a first electrostatic discharge (ESD) protection circuit connected to the first input pad and the control circuit through a first voltage line and configured to transmit the power voltage input to the first input pad, to the control circuit; and a second ESD protection circuit connected to the second input pad and the control circuit through a second voltage line and configured to transmit the data voltage input to the second input pad, to the control circuit.

The micro-pixel controller further includes: a third input pad to which a gate voltage is input; and a third ESD protection circuit connected to the third input pad and the control circuit through a third voltage line, and configured to transmit the gate voltage input to the third input pad, to the control circuit.

The micro-pixel controller further includes: a fourth input pad to which a control signal from a timing controller is input; and a fourth ESD protection circuit connected to the fourth input pad and the control circuit through a control signal line and configured to transmit the control signal input to the fourth input pad, to the control circuit.

The second input pad includes a fifth input pad to which a pulse amplitude modulation (PAM) voltage is input and a sixth input pad to which a pulse width modulation (PWM) voltage is input, wherein the second voltage line includes a fifth voltage line for transmitting the PAM voltage to the control circuit and a sixth voltage line for transmitting the PWM voltage to the control circuit, and wherein the second ESD protection circuit connected to the second voltage line includes a fifth ESD protection circuit connected to the fifth voltage line and a sixth ESD protection circuit connected to the sixth voltage line.

The micro-pixel controller outputs drive currents supplied to pixels provided in an m×n array among the plurality of pixels, wherein m and n are integers greater than or equal to 2.

The micro-pixel controller further includes: a plurality of output pads from which the drive currents to be supplied to the pixels in the m×n array are output; and a plurality of ESD protection circuits connected to a plurality of output lines that transfer the driving currents output from the plurality of pixel circuits, to the plurality of output pads.

The first ESD protection circuit connected to the first voltage line is provided in a number less than the integer n.

The second ESD protection circuit connected to the second voltage line is provided in a number less than the integer n.

The third ESD protection circuit connected to the third voltage line is provided in a number less than the integer m.

In accordance with an aspect of the disclosure, there is provided a display module including: a module substrate; and a plurality of pixel packages provided on the module substrate, wherein each of the plurality of pixel packages includes: a package substrate; a plurality of pixels provided on the package substrate; a micro-pixel controller provided between the plurality of pixels and configured to supply drive currents to the plurality of pixels; a first input pad to which a power voltage is input; a second input pad to which a data voltage is input; a first electrostatic discharge (ESD)

protection circuit connected to the first input pad and the micro-pixel controller through a first voltage line and configured to transmit the power voltage input to the first input pad, to the micro-pixel controller; and a second ESD protection circuit connected to the second input pad and the micro-pixel controller through a second voltage line and configured to transmit the data voltage input to the second input pad, to the micro-pixel controller.

Each of the plurality of pixel packages further includes: a third input pad to which a gate voltage is input; and a third ESD protection circuit connected to the third input pad and the micro-pixel controller through a third voltage line and configured to transmit the gate voltage, input to the third input pad, to the micro-pixel controller.

The plurality of pixels are provided on the package substrate in an m×n array, where m and n are integers greater than or equal to 2, wherein each of the first ESD protection circuit connected to the first voltage line and the second ESD protection circuit connected to the second voltage line are provided in a number less than the integer n, and wherein the third ESD protection circuit connected to the third voltage line is provided in a number less than the integer m.

In accordance with an aspect of the disclosure, there is provided a display apparatus including: a plurality of display modules; at least one driver integrated chip (IC) configured to drive the plurality of display modules; and a timing controller configured to control the plurality of display modules. Each of the plurality of display modules includes: a module substrate; and a plurality of pixel packages provided on the module substrate. Each of the plurality of pixel packages includes: a package substrate; a plurality of pixels provided on the package substrate; a micro-pixel controller provided between the plurality of pixels and configured to supply drive currents to the plurality of pixels; a first input pad to which a power voltage is input; a second input pad to which a data voltage is input; a first electrostatic discharge (ESD) protection circuit connected to the first input pad and the micro-pixel controller through a first voltage line and configured to transmit the power voltage input to the first input pad, to the micro-pixel controller; and a second ESD protection circuit connected to the second input pad and the micro-pixel controller through a second voltage line and configured to transmit the data voltage input to the second input pad, to the micro-pixel controller.

Each of the plurality of pixel packages further includes: a third input pad to which a gate voltage is input; and a third ESD protection circuit connected to the third input pad and the micro-pixel controller through a third voltage line and configured to transmit the gate voltage input to the third input pad, to the micro-pixel controller.

The plurality of pixels are provided on the package substrate in an m×n array, where m and n are integers greater than or equal to 2, wherein each of the first ESD protection circuit connected to the first voltage line and the second ESD protection circuit connected to the second voltage line are provided in a number less than the integer n, and wherein the third ESD protection circuit connected to the third voltage line is provided in a number less than the integer m.

Advantageous Effects

As is apparent from the above, according to a display module and a display apparatus including the same according to one aspect of the disclosure, since a thin film transistor circuit configured to drive an inorganic light emitting device is provided in a separate chip, circuit testing and replacement and a manufacturing process of the display module or the display apparatus including the display module may be more easily performed.

BRIEF DESCRIPTION OF THE DRAWINGS

The above and other aspects, features and advantages of certain embodiments of the disclosure will be more apparent from the following description taken in conjunction with the accompanying drawings, in which.

DETAILED DESCRIPTION

Figure 1:
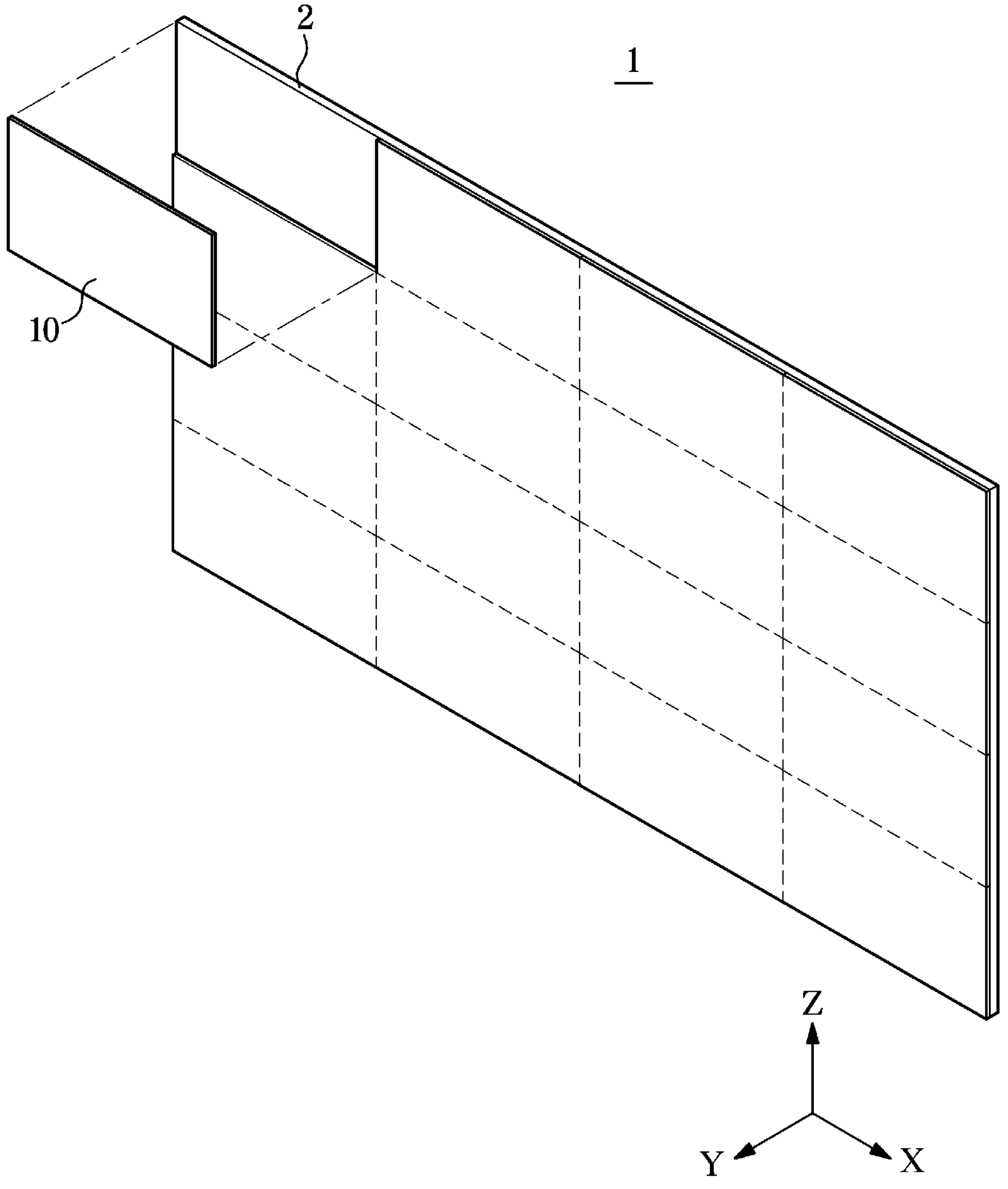
FIG. 1 is a perspective view illustrating an example of a display module and a display apparatus including the same according to an embodiment.

Embodiments are described in detail with reference to the accompanying drawings. Like reference numerals denote like elements throughout the specification. In the specification, all elements of the embodiments are not described, and general contents in the art or repeated contents between the embodiments will not be described. Terms such as parts, modules, members, and blocks may be implemented using software or hardware, and a plurality of parts, modules, members, and blocks are implemented as a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network, or electrically connected to another part through wiring, soldering, or the like.

In addition, when a part "includes" an element, another element may be further included, rather than excluding the existence of another element, unless otherwise described.

Throughout the specification, when a member is referred to as being "on" another member, the member may be in contact with another member or yet another member may be interposed between the two members.

Throughout the specification, when a member transmits or transfers a signal or data to another member, it does not preclude another member existing between the corresponding member and another member, and the signal or data is transmitted or transferred through another member unless otherwise described.

Through the specification, the expression of an ordinal number such as "first" and "second" is used to distinguish a plurality of members, and the used ordinal number does not indicate an arrangement order, a manufacturing order, importance, and the like of the members.

The singular expression includes a plural expression unless indicated otherwise in the context.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In each step, an identification symbol is used to refer to each step, the identification symbol does not limit the order of each step, and each step may be performed in an order different from the described order unless the context clearly indicates a specific order.

Hereinafter, a display module and a display apparatus including the display module according to one aspect will be described with reference to the accompanying drawings.

FIG. 1 is a perspective view illustrating an example of a display module and a display apparatus including the display module according to an embodiment.

The display apparatus according to an embodiment is a self-emissive display apparatus in which a light emitting device is disposed in each of pixels so that the pixel may emit light by itself. Accordingly, unlike a liquid crystal display apparatus, since the display apparatus according to an embodiment does not require components such as a backlight unit and a liquid crystal layer, a thin thickness may be implemented with a simple structure, and thus a design may be variously changed.

In addition, in the display apparatus according to an embodiment, an inorganic light emitting device such as an inorganic light emitting diode may be used as the light emitting device disposed in each of the pixels. A response time of the inorganic light emitting device is faster than a response time of an organic light emitting device such as an organic light emitting diode (OLED), and the inorganic light emitting device may provide high brightness with low power.

In addition, unlike the organic light emitting device which requires an encapsulation process because it is vulnerable to exposure to moisture and oxygen and has low durability, the inorganic light emitting device does not require an encapsulation process and has high durability. Hereinafter, the inorganic light emitting device, which will be described in the following embodiment, denotes the inorganic light emitting diode.

The inorganic light emitting device used in the display apparatus according to an embodiment may be a micro-LED having a size in which a length of a short side is about 100 μm to about several μm. As described above, when the LED having a size of a micro unit is used, a pixel size may be reduced and a high-resolution may be implemented in the same size screen.

In addition, when an LED chip is manufactured in the size of a micro unit, a problem of being broken when bent due to properties of an inorganic material may be solved. That is, when the micro-LED chip is transferred onto a flexible substrate, the LED chip is not broken even when the substrate is bent, and thus a flexible display apparatus may also be implemented.

The display apparatus, in which the micro-LED is used, may be applied to various fields by using a very small pixel size and a thin thickness. As an example, as illustrated in FIG. 1, a plurality of display modules 10 onto which a plurality of micro-LEDs are transferred may be tiled to be fixed to a housing 2 so as to implement a large-area screen. A display apparatus 1 having such a large-area screen may be used as a signage, an electronic board, and the like.

Alternatively or additionally, the display apparatus may be implemented as a foldable display apparatus, a rollable display apparatus, or the like.

A three-dimensional XYZ coordinate system illustrated in FIG. 1 is illustrated to describe the display apparatus 1. For example, a plane on which a screen of the display apparatus 1 is positioned is an XZ-plane, and a direction in which an image is output or a direction in which an inorganic light emitting device emits light is a +Y direction. Since the coordinate system is based on the display apparatus 1, the same coordinate system may be applied to other cases in which the display apparatus 1 is positioned differently.

For example, when the display apparatus 1 is used in a standing state, and a user watches an image from the front of the display apparatus 1, the +Y direction in which the image is output may be referred to as a forward direction, and the opposite direction may be referred to as a rearward direction.

In addition, the display apparatus 1 is generally manufactured in a lying state. Accordingly, a −Y direction of the display apparatus 1 may be referred to as a downward direction and the +Y direction may be referred to as an upward direction. That is, in an embodiment, the +Y direction may also be referred to as an upward direction or forward direction, and the −Y direction may also be referred to as a downward direction or rearward direction.

Except for an upper surface and a lower surface of the display apparatus 1 or the display module 10 having a flat plate shape, all of the remaining four surfaces may be referred to as side surfaces regardless of a posture of the display apparatus 1 or the display module 10.

In FIG. 1, a case in which the display apparatus 1 includes a plurality of display modules to implement a large-area screen is illustrated, but the embodiment of the display apparatus 1 is not limited thereto. The display apparatus 1 may include a single display module 10 and may be implemented as a television (TV), a wearable device, a portable device, a personal computer (PC) monitor, or the like.

The display module 10 may include M×N pixels (where, M and N are integers greater than or equal to two) arranged in an array, that is, a plurality of pixels which are two-dimensionally arranged. In the embodiment, a case in which some components are two-dimensionally arranged may include not only a case in which some components are arranged on the same plane but also a case in which some components are arranged on different planes parallel to each other. In addition, the case in which the corresponding components are arranged on the same plane does not denote that upper ends of the arranged components should be positioned on the same plane and may include a case in which the upper ends of the arranged components are positioned on different planes parallel to each other.

A single pixel may include a plurality of subpixels which output light having different colors to provide various colors by mixing colors. For example, a single pixel may be formed with at least three subpixels which output light having different colors. Specifically, a single pixel may be formed with a red subpixel, a green subpixel, and a blue subpixel respectively corresponding to red R, green G, and blue B. Here, a red subpixel may output red light, a green subpixel may output green light, and a blue subpixel may output blue light.

Subpixels may also be arranged in a line along an X-axis direction and may be arranged in a line along a Z-axis direction, or may not be arranged in a line.

In addition, each of the subpixels may have the same size or may have different sizes from each other.

The sizes or arrangement types of the subpixels are not limited as long as a single pixel includes the plurality of subpixels to emit various colors.

In addition, the pixel may not necessarily include the red subpixel which outputs the red light, the green subpixel which outputs the green light, or the blue subpixel which outputs the blue light. The pixel may also include a subpixel which outputs yellow light or white light. That is, a color or type of light output from each subpixel and the number of subpixels are not limited.

However, in an embodiment which will be described below, an example of the pixel including the red subpixel, the green subpixel, and the blue subpixel will be described for the sake of description.

As described above, each of the display modules 10 of the display apparatus 1 according to an embodiment is a self-emissive display apparatus of which each of the pixels may emit light by itself. Accordingly, inorganic light emitting devices which emit light of different colors may be disposed in the subpixels. For example, a red inorganic light emitting device may be disposed in the red subpixel, a green inorganic light emitting device may be disposed in the green subpixel, and a blue inorganic light emitting device may be disposed in the blue subpixel.

Accordingly, in the embodiment, the pixel may denote a cluster including a red inorganic light emitting device, a green inorganic light emitting device, and a blue inorganic light emitting device, and the subpixel may denote each of the inorganic light emitting devices.

Figure 2:
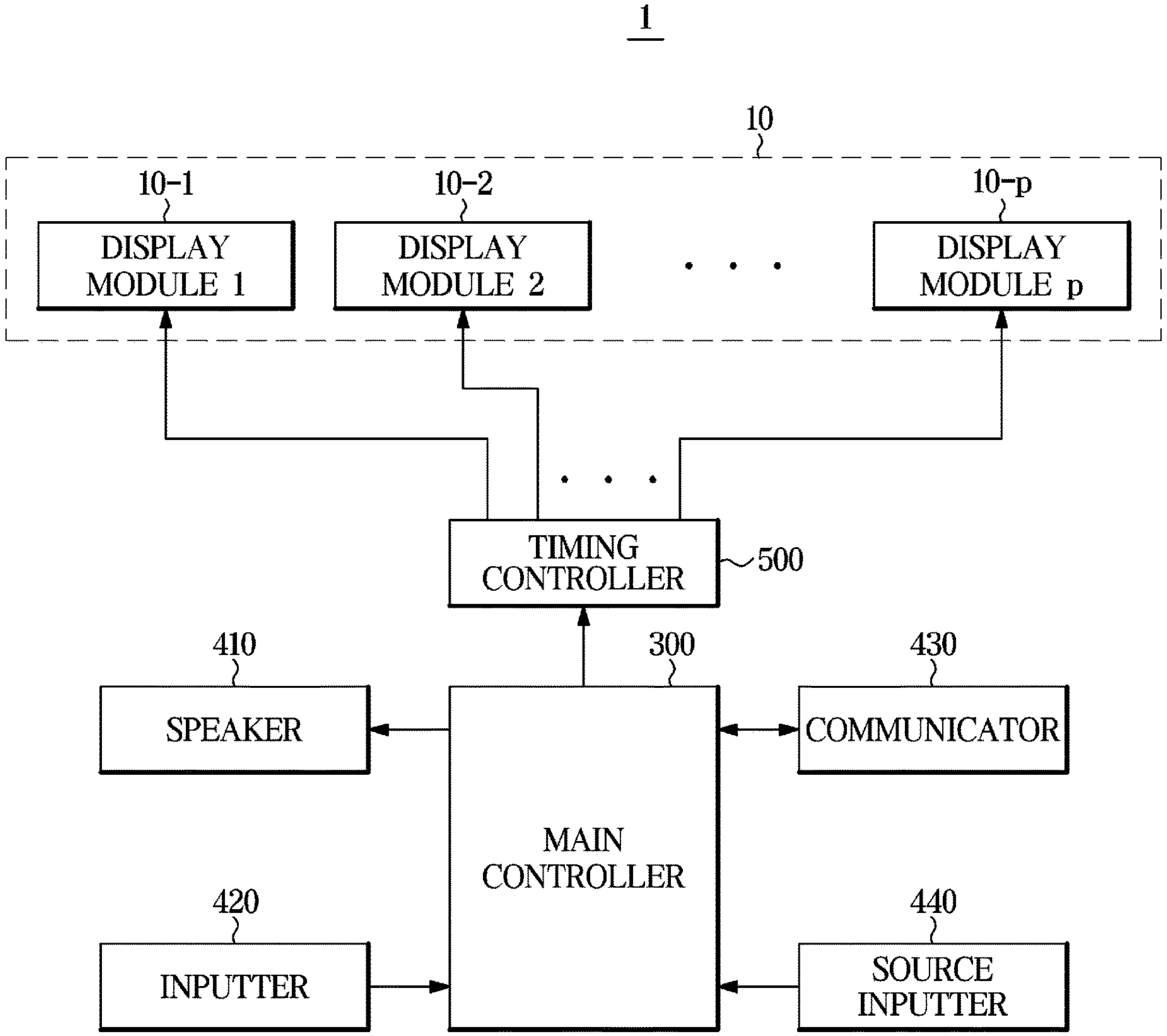
FIG. 2 is a control block diagrams illustrating a display apparatus according to an embodiment.
Figure 3:
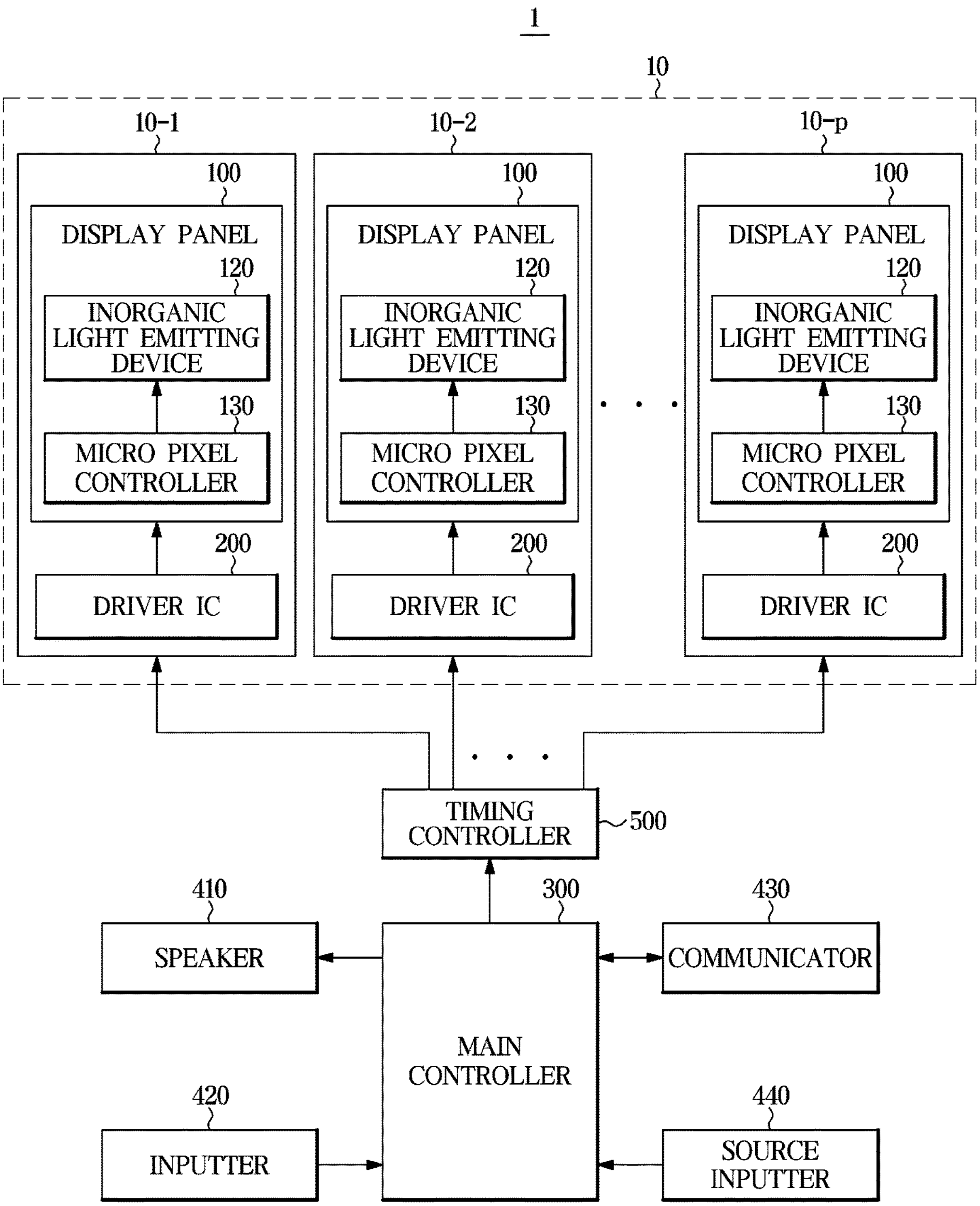
FIG. 3 is a control block diagram illustrating a display apparatus according to an embodiment.

FIGS. 2 and 3 are control block diagrams of the display apparatus according to an embodiment.

Referring to FIG. 2, the display apparatus 1 according to an embodiment may include a plurality of display modules 10 including a display module 1 10-1, a display module 2 10-2, . . . a display module 10-*p* (where, p is an integer greater than or equal to two), a main controller 300 and a timing controller 500 which control the plurality of display modules 10, a communication interface 430 which communicates with an external device, a source input interface 440 which receives a source image, a speaker 410 which outputs sound, and an input device 420 which receives a command for controlling the display apparatus 1 from a user.

The input device 420 may also include a button or a touch pad provided in one area of the display apparatus 1, and in a case in which a display panel 100 (see FIG. 3) is implemented as a touch screen, the input device 420 may include the touch pad provided on a front surface of a display panel 100. In addition, the input device 420 may also include a remote controller.

The input device 420 may receive various commands for controlling the display apparatus 1 from a user to perform, for example, power on/off, volume adjustment, channel adjustment, screen adjustment, various setting changes, and the like of the display apparatus 1.

The speaker 410 may be provided in one area of a housing 2 of the display apparatus 1, and a speaker module physically separated from the housing 2 may be additionally or alternatively provided.

The communication interface 430 may communicate with a relay server or other electronic devices to transmit and receive relevant data. The communication interface 430 may use at least one of various wireless communication methods such as 3rd Generation (3G), 4th Generation (4G), wireless local area net (LAN), Wi-Fi, Bluetooth, Zigbee, Wi-Fi Direct (WFD), ultra-wideband (UWB), Infrared Data Association (IrDA), Bluetooth Low Energy (BLE), near field communication (NFC), and Z-Wave. In addition, the communication interface 430 may also use a wired communication method such as Peripheral Component Interconnect (PCI), PCI-express, or Universe Serial Bus (USB).

The source input interface 440 may receive a source signal input from a set-top box, a USB, an antenna, or the like. Accordingly, the source input interface 440 may include at least one selected from a source input interface group consisting of a High-Definition Multimedia Interface (HDMI) cable port, a USB port, an antenna port, and the like.

The source signal received by the source input interface 440 may be processed by the main controller 300 and converted into the form capable of being output from the display panel 100 and the speaker 410.

The main controller 300 and the timing controller 500 may each include at least one memory which stores a program for performing an operation, which will be described below, and various pieces of data and at least one processor configured to execute the stored program. However, the one or more embodiments are not limited thereto, and the main controller 300 and the timing controller 500 may be implemented together using one memory and one processor.

The main controller 300 may process a source signal input through the source input interface 440 to generate an image signal corresponding to the input source signal.

For example, the main controller 300 may include a source decoder, a scaler, an image enhancer, and a graphic processor. The source decoder may decode a source signal compressed in a format such as Moving Picture Experts Group (MPEG) and the like, and the scaler may output image data of a desired resolution through resolution conversion.

The image enhancer may improve image quality of image data by applying various compensation techniques. The graphic processor may divide pixels of image data into red-green-blue (RGB) data to output together with a control signal such as a syncing signal for a display timing at the display panel 100. The main controller 300 may output image data and a control signal which corresponds to a source signal.

The above-described operation of the main controller 300 is only an example of the display apparatus 1, other operations may be further performed, and some operations among the above-described operations may be omitted.

The image data and the control signal output from the main controller 300 may be transmitted to the timing controller 500.

The timing controller 500 may generate various control signals such as a timing control signal for converting the image data transmitted from the main controller 300 to image data having the form processable in a driver integrated circuit (IC) 200 (see FIG. 3) and displaying the image data on the display panel 100.

Referring to FIG. 3, each of the plurality of display modules 10-1, 10-2 . . . and **10-*p* may include the display panel 100 which displays an image and the driver IC 200 which drives the display panel 100**.

The display panel 100 may include the plurality of pixels which are two-dimensionally arranged as described above, and each pixel may include the plurality of subpixels that emit various colors.

In addition, as described above, the display apparatus 1 according to an embodiment is a self-emissive display apparatus in which each pixel may emit light by itself. Accordingly, an inorganic light emitting device 120 may be disposed in each of the subpixels. That is, each of the plurality of pixels may be formed with two or more inorganic light emitting devices 120.

Although each of the inorganic light emitting devices 120 may be driven in an active matrix (AM) or passive matrix (PM) manner, in the one or more embodiments of the disclosure, the case in which the inorganic light emitting device 120 is driven in the AM manner will be described as an example.

In the display module 10 according to an embodiment, each of the inorganic light emitting devices 120 may be individually controlled by each of micro-pixel controllers 130, and each of the micro-pixel controllers 130 may operate based on a drive signal output from each of the drivers IC 200 or a timing control signal output from the timing controller 500.

The driver IC 200 may generate a data signal for representing a grayscale of an image based on the image data transmitted from the timing controller 500. As will be described below, the data signal may include a data voltage input to a pixel circuit (131P in FIG. 5).

The display apparatus 1 according to an embodiment may not need to be implemented a large-area screen, and the display apparatus 1 may include a single display module instead of a plurality of display modules. Accordingly, the embodiment of the display module 10 described below may be applied to the display apparatus 1 including a plurality of display modules, and may also be applied to the display apparatus 1 including a single display module.

Figure 4:
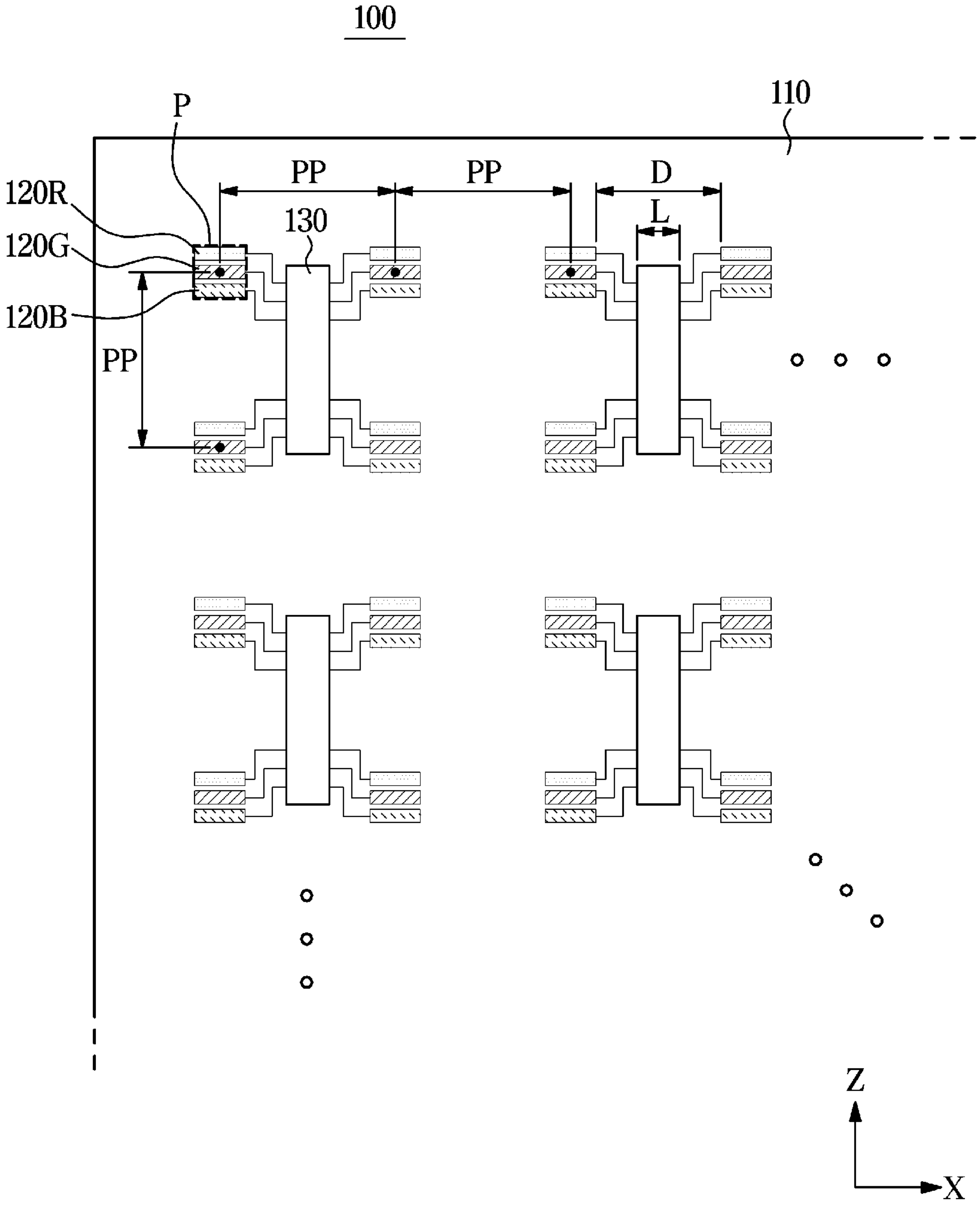
FIG. 4 is a diagram illustrating an example of a micro-pixel controller and pixels in a display module according to an embodiment.

FIG. 4 is a diagram illustrating an example of arrangement of a micro-pixel controller and pixels in a display module according to an embodiment.

In the display module 10 according to an embodiment, a single micro-pixel controller 130 may control two or more pixels P. In an embodiment to be described below, a case in which a single micro-pixel controller 130 controls four pixels P arranged in a 2×2 array will be described as an example.

Referring to FIG. 4, the inorganic light emitting device 120 and the micro-pixel controller 130 may be disposed on the module substrate 110. The module substrate 110 may be implemented as one of substrates formed of various materials such as a silicon substrate, a glass substrate, a plastic substrate, a printed circuit board (PCB), an flexible printed circuit board (FPCB), and a cavity substrate.

The pixel circuit for switching and driving the inorganic light emitting device 120 may not be directly mounted on the module substrate 110 but may be provided in the micro-pixel controller 130. As such, circuit devices, such as thin film transistors, do not need to be formed on the module substrate 110 in addition to the electrode pad or the wiring. Accordingly, when the type of the module substrate 110 is selected, certain restrictions, such as arrangement and performance of the thin film transistor, do not need to be considered. For example, the module substrate 110 may be implemented as a glass substrate having high durability against heat emitted from the inorganic light emitting device 120.

In addition, since the circuit devices, such as the thin film transistor, are not provided on the module substrate 110, the circuit devices may be prevented from being broken in a process of cutting the module substrate 110, forming the wire, or replacing the inorganic light emitting device 120, and a difficulty of manufacturing process of the display module 10 may be reduced.

The micro-pixel controller 130 may have a structure in which a pixel circuit for switching and driving the inorganic light emitting device 120 is mounted on an IC substrate. As will be described below, the pixel circuit includes a thin film transistor for switching and driving the inorganic light emitting device 120.

The IC substrate may be implemented as one of substrates formed of various materials, such as a silicon substrate, a glass substrate, a plastic substrate, a PCB, an FPCB, and a cavity substrate. Since the micro-pixel controller 130 is provided with a heat source, such as an inorganic light emitting device, the type of the substrate may be selected without limitation according to heat resistance of the material.

The thin film transistor formed on the IC substrate may be a silicon-based transistor or an oxide transistor. The silicon-based transistor may be an amorphous silicon (a-Si) thin film transistor, a single crystal thin film transistor, or a polycrystalline silicon thin film transistor. As an example, the polycrystalline thin film transistor may be a low temperature polycrystalline silicon (LTPS) thin film transistor generated under a low temperature condition.

In a case in which the thin film transistor included in the pixel circuit is the LTPS thin film transistor, there may be a restriction according to electron mobility when the IC substrate is selected. When the IC substrate is implemented as a silicon substrate, since a silicon substrate does not have restriction on electron mobility when compared to a glass substrate, performance of the LTPS thin film transistor may be improved. In the embodiment, since heat from the inorganic light emitting device 120 is transferred onto the module substrate 110, the IC substrate may be implemented as the silicon substrate without certain restriction on heat resistance.

Before the micro-pixel controller 130 is transferred onto the module substrate 110, circuit testing may be performed on each of the micro-pixel controllers 130, and only the micro-pixel controller 130 determined as having good quality through the circuit testing may be mounted on the display module 10. For example, the micro-pixel controller 130 may be tested such that only the micro-pixel controller 130 outputting a predetermined value may be mounted on the display module 10. Accordingly, when compared to a case in which the thin film transistor circuit is directly mounted on the module substrate, circuit testing and replacement of a defective product are easier.

As described above, the plurality of pixels P may be two-dimensionally arranged on the module substrate 110, and the micro-pixel controller 130 may be disposed in a space, in which the pixels P are not arranged, on the module substrate 110.

When the plurality of pixels P are disposed on the module substrate 110, a pixel spacing PP between adjacent pixels positioned on the top, bottom, left, and right sides with respect to the micro-pixel controller 130 may be the same. In embodiments, values that are described as being the same may include not only a case in which the corresponding values are exactly the same, but also a case in which the corresponding values are within a predetermined error range.

The pixel spacing PP may be referred to as a pixel pitch, and in an embodiment, the pixel spacing PP may be a distance from a center of one pixel to a center of an adjacent pixel. However, the one or more embodiments of the display module 10 is not limited thereto, and the pixel spacing PP may be variously applied.

For example, the micro-pixel controller 130 may have a rectangular hexahedron shape, and the micro-pixel controller 130 may have an ultra-small size in which a length L of a short side of an upper surface or lower surface of the micro-pixel controller 130 is smaller than a distance D between edges of the pixels P adjacent to each other. The short side of the micro-pixel controller 130 may be disposed parallel to a line indicating the shortest distance between two pixels P adjacent to each other. In this case, the distance D between the boundary lines of the pixels P adjacent to each other may denote a distance between the inorganic light emitting devices 120 included in different pixels P among the inorganic light emitting devices 120 adjacent to each other.

That is, the micro-pixel controller 130 may be disposed without affecting the spacing between the plurality of pixels P. Accordingly, even when the micro-pixel controller 130 is disposed between the pixels P, the spacing between the pixels P may be minimized to implement a high-resolution in the same region.

The micro-pixel controller 130 may supply a drive current to control target pixels. As illustrated in FIG. 4, when four control target pixels are provided for each micro-pixel controller 130, and one pixel has three sub-pixels, that is, a red inorganic light emitting device, a green inorganic light emitting device, and a blue inorganic light emitting device a single micro-pixel controller 130 may supply a drive current to the twelve inorganic light emitting devices 120.

Figure 5:
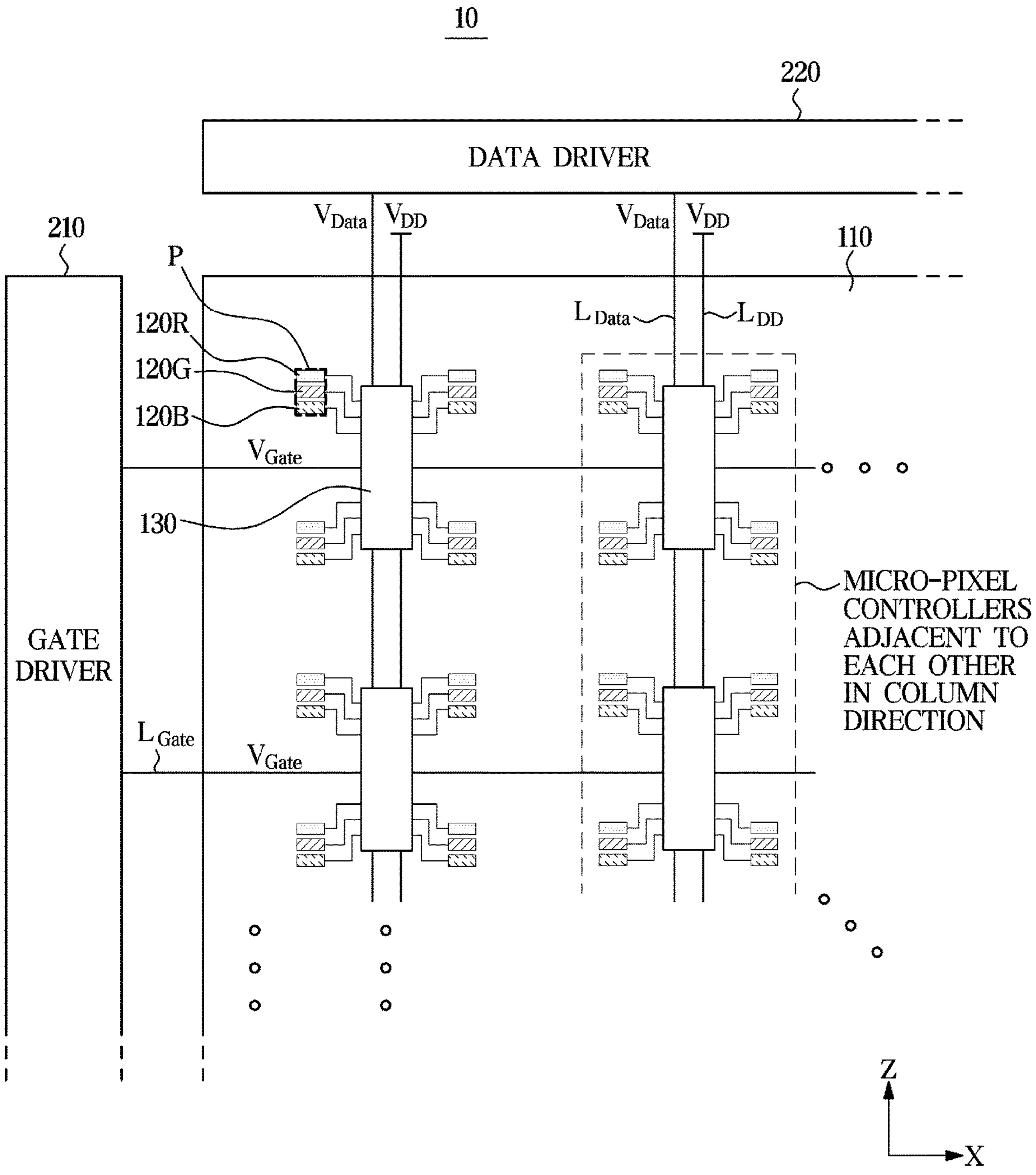
FIG. 5 is a diagram illustrating an example of a signal input from a driver IC to a micro-pixel controller in a display module according to an embodiment.

FIG. 5 is a diagram illustrating an example of a signal input from a driver IC to a micro-pixel controller, in a display module according to an embodiment;

For example, the driver IC 200 may include a gate driver 210 and a data driver 220. The gate driver 210 may output a gate voltage for turning the subpixel on/off, and the data driver 220 may output a data voltage corresponding image information to be displayed.

Referring to FIG. 5, a gate voltage $V_{Gate}$ output from the gate driver 210 may be input to the micro-pixel controller 130 through a gate voltage line $L_{Gate}$, and a data voltage $V_{Data}$ output from the data driver 220 may be input to the micro-pixel controller 130 through a data voltage line $L_{Data}$. In addition, a power voltage $V_{DD}$ supplied from the outside of the display panel 100 may be input to the micro-pixel controller 130 through a power voltage line $L_{DD}$.

However, in another example, the gate driver 210 may be omitted, and a gate voltage may be generated in the micro-pixel controller 130.

The data voltage lines $L_{Data}$ may be connected to the micro-pixel controllers 130 in units of columns. In the example of FIG. 5, the data voltage lines $L_{Data}$ may be connected to the micro-pixel controllers 130 such that a single data voltage line $L_{Data}$ is electrically connected to each micro-pixel controller 130, and the micro-pixel controllers 130 adjacent in a column direction (the Z-axis direction) may share a single data voltage line $L_{Data}$.

Accordingly, when a plurality of pixels are arranged in an M×N array on the display panel 100, the driver IC 200 (e.g., data driver) may be electrically connected to the display panel 100 by N/n (where, n is the number of columns of pixels controlled by a single micro-pixel controller) data voltage lines $L_{Data}$.

The data driver 220 may independently adjust the data voltage transmitted to each of the data voltage line $L_{Data}$. Accordingly, micro-pixel controllers 130 connected to the same data voltage line $L_{Data}$ are supplied with data voltages of the same magnitude, and micro-pixel controllers 130 connected to different data voltage lines $L_{Data}$ are supplied to data voltages of different magnitudes.

The gate voltage lines $L_{Gate}$ may be connected to the micro-pixel controllers 130 in units of row. In the example of FIG. 5, the gate voltage lines $L_{Gate}$ may be connected to the micro-pixel controllers 130 such that a single gate voltage line $L_{Gate}$ is electrically connected to each micro-pixel controller 130, and the micro-pixel controllers 130 adjacent in a row direction (the X-axis direction) may share a single gate voltage line $L_{Gate}$.

Accordingly, when a plurality of pixels are arranged in an M×N array on the display panel 100, the driver IC 200 (e.g., gate driver) may be electrically connected to the display panel 100 by M/m (m is the number of rows of pixels controlled by a single micro-pixel controller) gate voltage lines $L_{Gate}$.

The micro-pixel controllers 130 adjacent in the row direction may refer to micro-pixel controllers 130 of which control target pixels are disposed in the same row, that is, micro-pixel controllers 130 that control pixels disposed in the same row. For example, when a single micro-pixel controller 130 controls pixels in a 2×2 array, a plurality of micro-pixel controllers 130 controlling pixels disposed in the first row and the second row on the module substrate 110 may refer to micro-pixels 130 arranged adjacent to each other in the row direction.

In addition, the micro-pixel controllers 130 adjacent in the column direction may refer to micro-pixel controllers 130 of which control target pixels are disposed in the same column, that is, micro-pixel controllers 130 that control pixels disposed in the same column. For example, when a single micro-pixel controller 130 controls pixels in a 2×2 array, a plurality of micro-pixel controllers 130 controlling pixels disposed in the first column and the second column on the module substrate 110 may refer to micro-pixel controllers 130 arranged adjacent to each other in the column direction.

Figure 6:
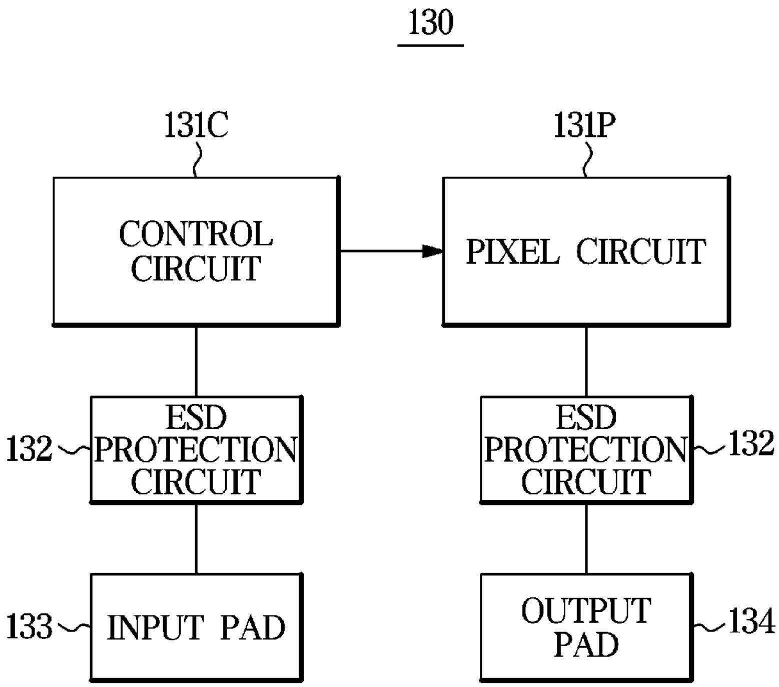
FIG. 6 is a control block diagram for describing an operation of a micro-pixel controller in a display module according to an embodiment.
Figure 7:
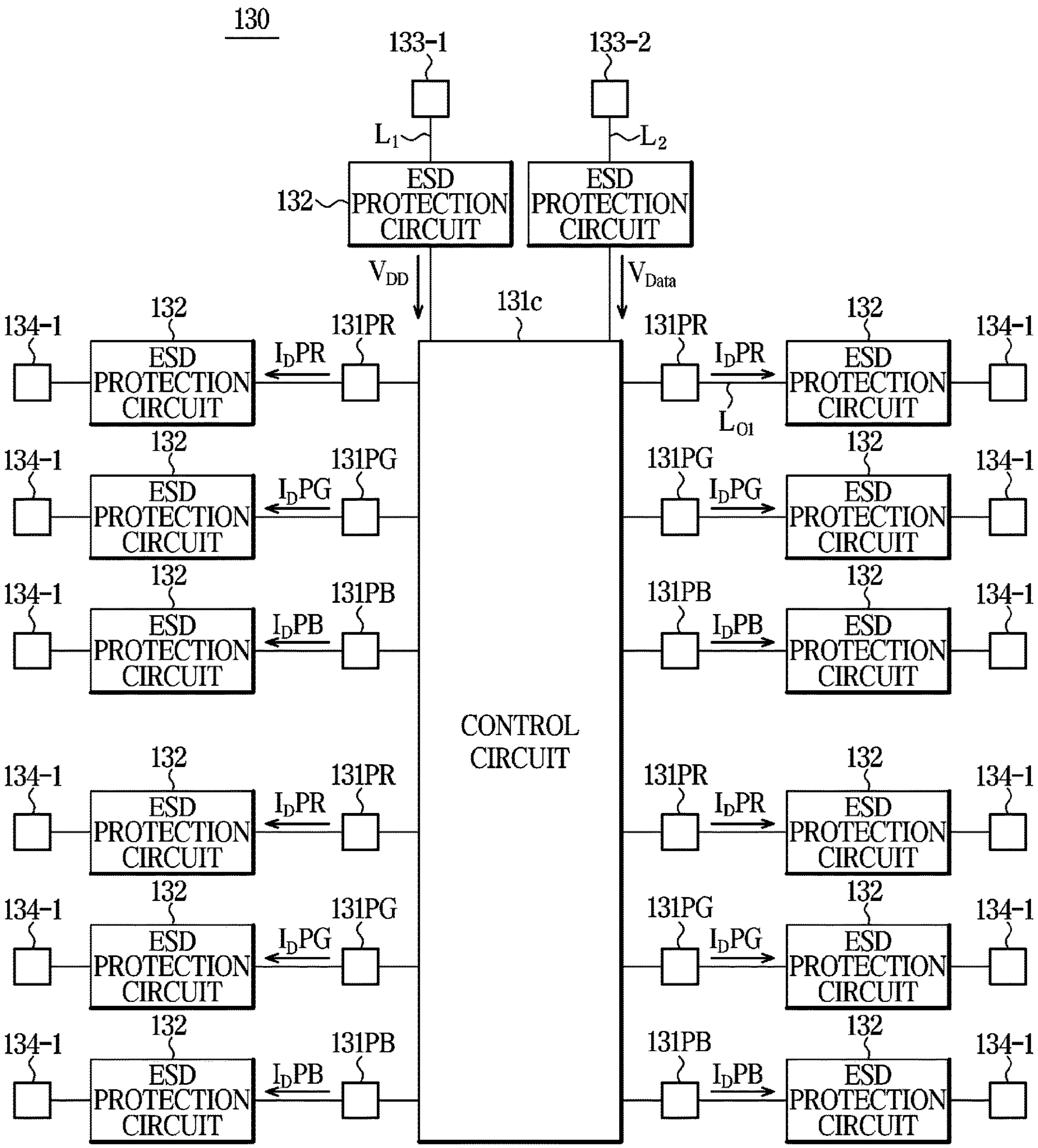
FIG. 7 is a diagram schematically illustrating an internal configuration of a micro-pixel controller in a display module according to an embodiment.

FIG. 6 is a control block diagram for describing an operation of a micro-pixel controller, in a display module according to an embodiment, and FIG. 7 is a diagram schematically illustrating an internal configuration of a micro-pixel controller, in a display module according to an embodiment.

Referring to FIG. 6, the micro-pixel controller 130 may include a pixel circuit 131P and may be configured to turn on/off a control target pixel and supply a drive current to the control target pixel. The micro-pixel controller 13 may include a control circuit 131C to appropriately distribute various signals input to the micro-pixel controller 130 to the pixel circuits 131P.

In addition, the micro-pixel controller 130 may be provided with an input pad 133 to which a signal is input from external devices and an output pad 134 from which a signal is output to the external devices. In an external environment, particularly in a manufacturing environment or use environment of the micro-pixel controller 130 and the display module 10 including the micro-pixel controller 130, or the display apparatus 1 including the same, an electrostatic discharge (ESD) phenomenon through the input pad or the output pad provided in the micro-pixel controller 130 may occur and damage devices in the micro-pixel controller 130.

When an ESD protection circuit for protecting circuit devices from such an ESD phenomenon is installed on the module substrate 110, the ESD protection circuit may affect image quality and the like. For example, when the module substrate 110 is used for a bezel-less display apparatus, the ESD protection circuit is disposed in an active area, and the ESD protection circuit disposed in the active area may cause red light, green light, or blue light emitted from the inorganic light emitting device to have a color difference perceived with naked eyes.

In addition, when display modules having an ESD protection circuit disposed in the edge area are tiled to implement a large-area screen, the boundary between the display modules may be visually recognized due to light being reflected by the ESD protection circuit.

However, the display module 10 of the display apparatus 1 may have the ESD protection circuit disposed in the micro-pixel controller or the pixel package (see FIG. 12) as will be described below, thereby obviating a need to dispose the ESD protection circuit in the module substrate 110.

Referring to FIG. 7, a power voltage $V_{DD}$ supplied from an external power source may be input to a first input pad 133-1 provided in the micro-pixel controller 130, and a data voltage $V_{Data}$ transmitted from the driver IC 200 may be input to a second input pad 133-2 provided in the micro-pixel controller 130.

The first input pad 133-1 may be connected to the control circuit 131C through a first voltage line L1, and the power voltage $V_{DD}$ input to the first input pad 133-1 may be transmitted to the control circuit 131C through the first voltage line L1.

The second input pad 133-2 may be connected to the control circuit 131C through a second voltage line L2, and the data voltage $V_{Data}$ input to the second input pad 133-2 may be transmitted to the control circuit 131C through the second voltage line L2.

ESD protection circuits 132 may be provided between the first input pad 133-1 and the control circuit 131C and between the second input pad 133-2 and the control circuit 131C.

For example, the first voltage line L1 connecting the first input pad 133-1 to the control circuit 131C may be connected to the ESD protection circuit 132 so that static electricity introduced through the first input pad 133-1 may be discharged to a ground voltage $V_{SS}$ line.

In addition, the second voltage line L2 connecting the second input pad 133-2 to the control circuit 131C may be connected to the ESD protection circuit 132 so that static electricity introduced through the second input pad 133-2 may be discharged to a ground voltage $V_{SS}$ line.

The control circuit 131C may distribute the transmitted power voltages and data voltages to the plurality of pixel circuits 131P. The control circuit 131C distributes a plurality of signals input through a single line to the plurality of pixel circuits 131P so that the number of lines required for the display panel 100 to be connected to the driver IC 200 or the timing controller 500 may be reduced.

For example, when a single micro-pixel controller 130 controls pixels of a 2×2 array, the power voltages to be applied to the pixels arranged in two columns may be received through a single line, and the data voltages to be applied to the pixels arranged in the two columns may also be received through a single line. That is, the number of lines required for application of the power voltages and the number of lines required for application of the data voltages may be reduced by half.

In addition, as the number of lines required for application of the power voltages and the number of lines required for application of the data voltages decrease, the number of input pads provided in the micro-pixel controller 130 may also decrease.

As the number of input pads decreases, the number of ESD protection circuits 132 for protecting devices from discharge of static electricity introduced from the input pads may also be reduced.

In other words, when a plurality of pixels are controlled using a single micro-pixel controller 130 according to the embodiment, not only the number of lines required for application of voltages, but also the number of ESD protection circuits 132 may also be reduced. When the number of ESD protection circuits 132 disposed in the micro-pixel controller 130 is reduced, the space in the micro-pixel controller 130 may be efficiently used.

In addition, when the power voltage and the data voltage are transmitted between the micro-pixel controllers 130 disposed adjacent to each other, an output pad for outputting the power voltage and the data voltage to the next micro-pixel controller 130 adjacent in the column direction and an ESD protection circuit may be further disposed.

When a single micro-pixel controller 130 controls four pixels, and a single pixel includes a red sub-pixel, a green sub-pixel, and a blue sub-pixel, a red sub-pixel circuit 131PR, a green sub-pixel circuit 131PG, and a blue sub-pixel circuit 131PB may be respectively provided for the four pixels as in the example of FIG. 7.

Referring to FIG. 7, a drive current $I_D$PR for driving a red inorganic light emitting device 120R (shown in FIG. 5) may be output from the red sub-pixel circuit 131PR, a drive current $I_D$PG for driving a green inorganic light emitting device 120G (shown in FIG. 5) may be outputted from the green sub-pixel circuit 131PG, and a drive current $I_D$PB for driving a blue inorganic light emitting device 120B (shown in FIG. 5) may be output from the blue sub-pixel circuit 131PB.

The micro-pixel controller 130 may be provided with a plurality of first output pads 134-1 each outputting one of the drive currents $I_D$PR, $I_D$PG, and $I_D$PB, and a plurality of first output lines LO-1 connecting the plurality of first output pads 134-1 to the plurality of pixel circuits 131P are each provided with an ESD protection circuit 132 for discharging static electricity introduced from the first output pad 134-1 to a ground voltage $V_{SS}$ line.

Figure 8:
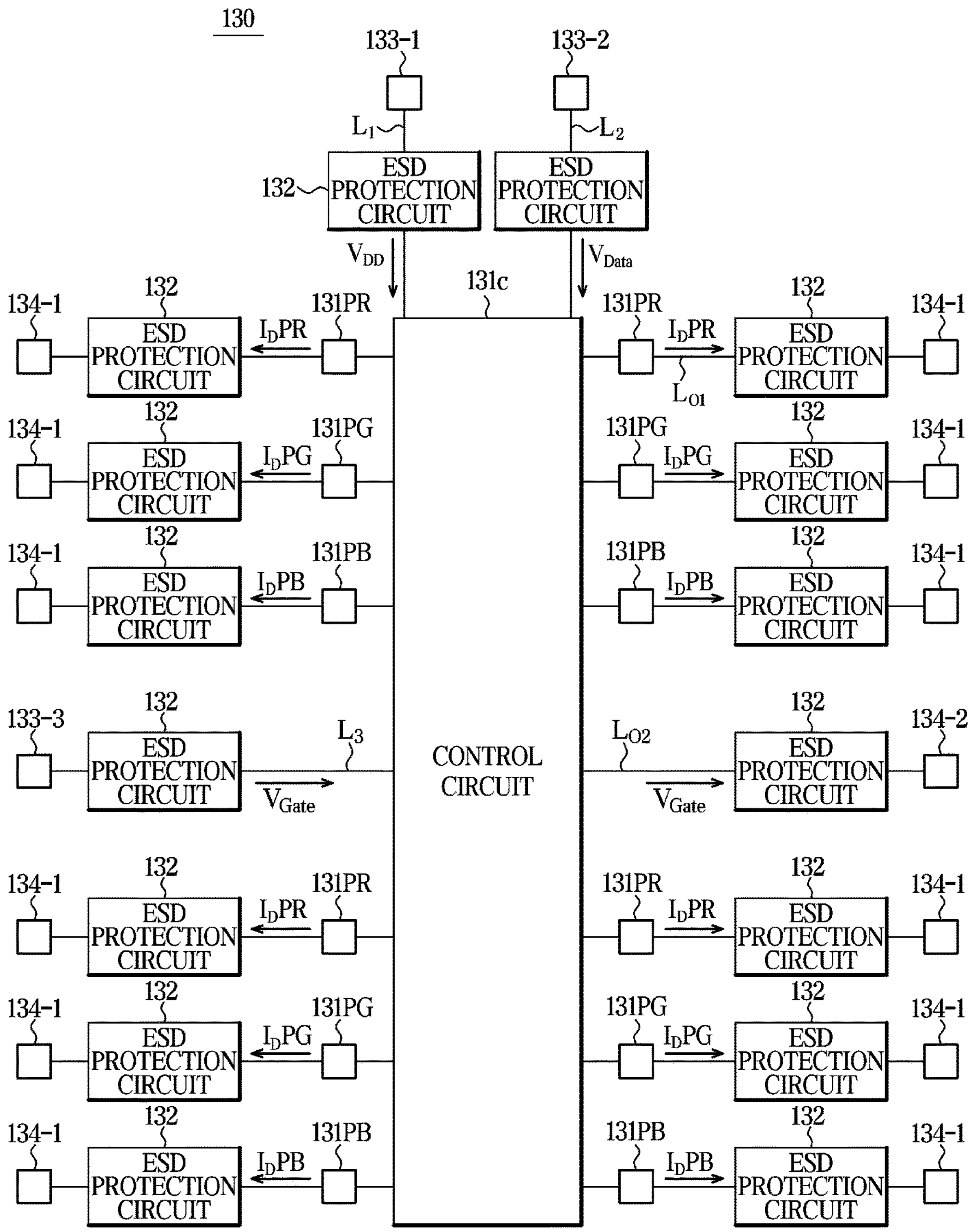
FIGS. 8 to 10 are diagrams illustrating examples of an electro static discharge (ESD) circuit disposed inside a micro-pixel controller in a display module according to an embodiment.
Figure 9:
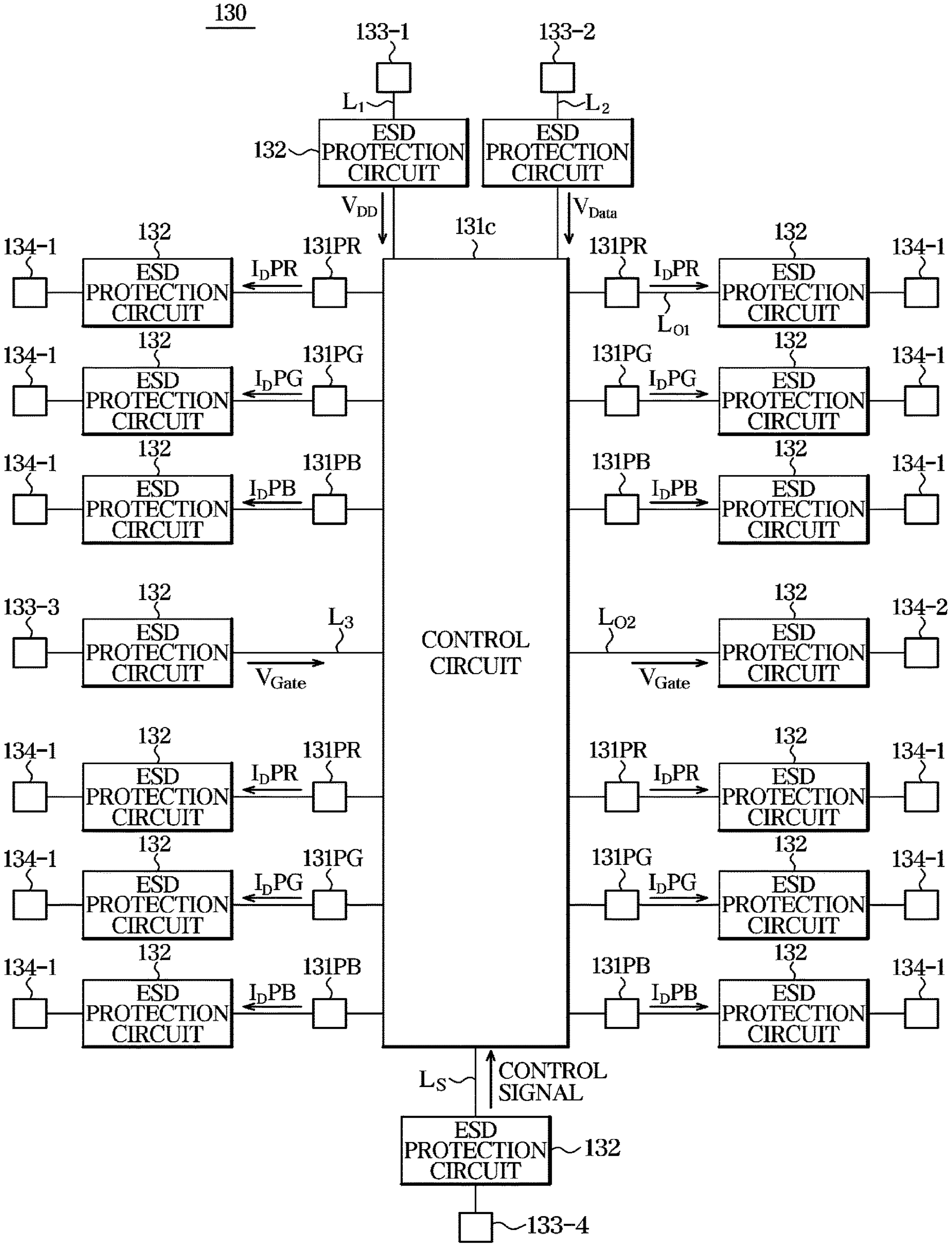
Figure 10:
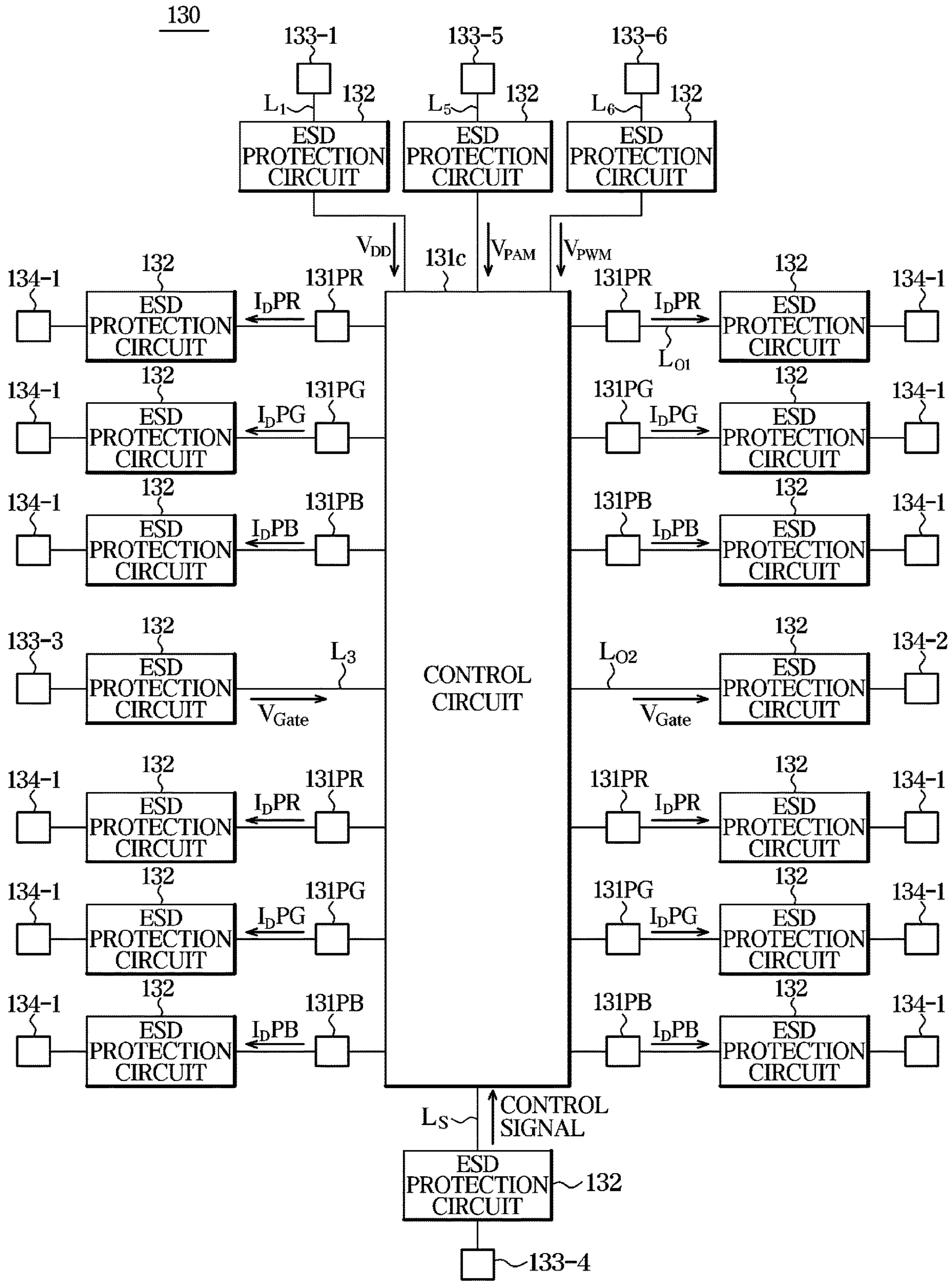

FIGS. 8 to 10 are diagrams illustrating examples of an electro static discharge (ESD) circuit disposed inside a micro-pixel controller, in a display module according to an embodiment.

Referring to FIG. 8, the gate voltage may be input from the outside of the micro-pixel controller 130. To this end, the micro-pixel controller 130 may be provided with a third input pad 133-3 to which the gate voltage is input.

The gate voltage may be output from the gate driver 210 or transmitted from another micro-pixel controller 130 adjacent in the row direction.

The third input pad 133-3 may be connected to the control circuit 131C through a third voltage line L3, and a gate voltage $V_{Gate}$ input to the third input pad 133-3 may be transmitted to the control circuit 131C through the third voltage line L3.

An ESD protection circuit 132 may be provided between the third input pad 133-3 and the control circuit 131C. For example, the third voltage line L3 connecting the third input pad 133-3 to the control circuit 131C may be connected to the ESD protection circuit 132 so that static electricity introduced through the third input pad 133-3 may be discharged to a ground voltage $V_{SS}$ line.

The control circuit 131C may distribute the gate voltages to the plurality of pixel circuits 131P. In addition, the control circuit 131C may transmit the input gate voltage to the next micro-pixel controller 130 adjacent in the row direction. To this end, the micro-pixel controller 130 may be provided with a second output pad 134-2 from which a gate voltage is output.

A second output line LO-2 connecting the second output pad 134-2 to the control circuit 131C may be connected to an ESD protection circuit that discharges static electricity introduced through the second output pad 134-2 to a ground voltage $V_{SS}$ line.

For example, when a single micro-pixel controller 130 controls pixels of a 2×2 arrays, gate voltages to be applied to pixels arranged in two rows may be received through a single line. That is, the number of lines required for application of the gate voltages may be reduced by half.

In addition, as the number of lines required for application of the gate voltages decrease, the number of input pads provided in the micro-pixel controller 130 may also decrease. As the number of input pads decreases, the number of ESD protection circuits 132 required for the input pads may also be reduced.

Alternatively or additionally, the gate driver 210 may be omitted, and a gate voltage may be generated in the micro-pixel controller 130. In this case, a timing control signal transmitted from the timing controller 500 may be input to the micro-pixel controller 130, and a gate voltage generating circuit in the micro-pixel controller 130 may generates a gate voltage based on the input timing control signal.

As described above with reference to FIGS. 7 and 8, when the data voltages, the power voltages, the gate voltages, etc. to be applied to a plurality of pixels are input through a respective single line, the control circuit 131C may distribute the input voltages to the plurality of pixels appropriately.

Such an operation of the control circuit 131C may be performed based on a control signal input from the outside of the micro-pixel controller 130. For example, the control signal may be output from the timing controller 500.

Referring to FIG. 9, the micro-pixel controller 130 may be provided with a fourth input pad 133-4 to which a control signal is input. The fourth input pad 133-4 may be connected to the control circuit 131C through a control signal line LS, and the control signal input to the fourth input pad 133-4 may be transmitted to the control circuit 131C through the control signal line LS.

The control signal line LS connecting the fourth input pad 133-4 to the control circuit 131C may be connected to an ESD protection circuit 132 that discharges static electricity introduced through the fourth input pad 133-4 to a ground voltage $V_{SS}$ line.

FIG. 10 is a diagram illustrating an example of an ESD circuit disposed inside a micro-pixel controller, in a display module according to an embodiment.

A method of controlling brightness of the inorganic light emitting device includes a pulse amplitude modulation (PAM) method in which the amplitude of a drive current is controlled, a pulse width modulation method (PWM) in which the pulse width of a drive current is controlled, and a hybrid method in which the PAM method and the PWM method are both used.

In the hybrid control method, the data voltage used for image implementation may include a PAM voltage and a PWM voltage. A PAM voltage $V_{PAM}$ and a PWM voltage $V_{PWM}$ may be output from the driver IC 200 or the timing controller 500, and as shown in FIG. 10, the micro-pixel controller 130 may be provided with a fifth input pad 133-5 to which the PAM voltage $V_{PAM}$ is input and a sixth input pad 133-6 to which the PWM voltage $V_{PWM}$ is input.

The fifth input pad 133-5 may be connected to the control circuit 131C through a fifth voltage line L5, and the PAM voltage $V_{PAM}$ input to the fifth input pad 133-5 may be transmitted to the control circuit 131C through the fifth voltage line L5.

The sixth input pad 133-6 may be connected to the control circuit 131C through a sixth voltage line L6, and the PWM voltage $V_{PWM}$ input to the sixth input pad 133-6 may be transmitted to the control circuit 131C through the sixth voltage line L6.

The fifth voltage line L5 connecting the fifth input pad 133-5 to the control circuit 131C may be connected to an ESD protection circuit 132 that discharges static electricity introduced through the fifth input pad 133-5 to a ground voltage $V_{SS}$ line.

The sixth voltage line L6 connecting the sixth input pad 133-6 to the control circuit 131C may be connected to an ESD protection circuit 132 that discharges static electricity introduced through the sixth input pad 133-6 to a ground voltage $V_{SS}$ line.

Figure 11:
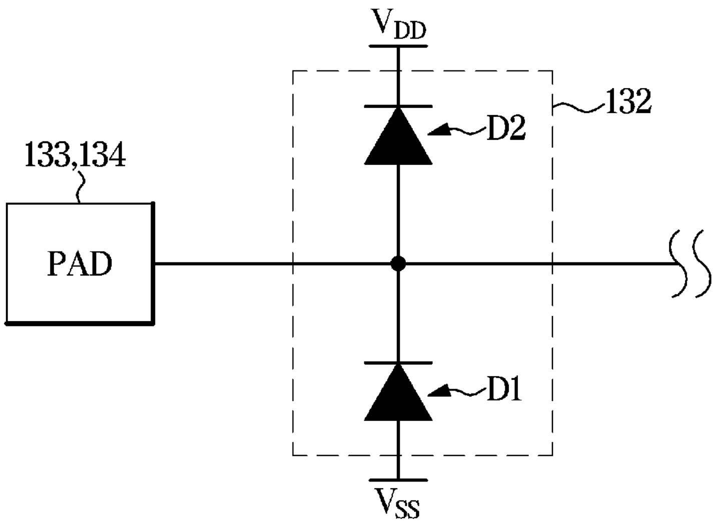
FIG. 11 is a diagram illustrating an ESD protection circuit disposed in a micro-pixel controller in a display module according to an embodiment.

FIG. 11 is a diagram illustrating an example of an ESD protection circuit disposed in a micro-pixel controller in a display module according to an embodiment.

Referring to FIG. 11, the ESD protection circuit 132 may include a first diode D1 having one end connected to a ground voltage $V_{SS}$ line and a second diode D2 having one end connected to a power voltage $V_{DD}$ line. The other end of the first diode D1 may be connected to the other end of the second diode D2. The plurality of pads 133 and 134 may be connected to a node between the first diode D1 and the second diode D2.

The ESD protection circuit 132 as in the example of FIG. 11 may discharge negative (−) static electricity introduced to the pads 133 and 134 to the ground voltage $V_{SS}$ line through the first diode D1, and may discharge positive (+) static electricity introduced to the pads 133 and 134 to the power voltage $V_{DD}$ line through the second diode D2.

Alternatively or additionally, the ESD protection circuit 132 may include a two-way transient voltage suppression TVS, and both positive (+) static electricity and negative (−) static electricity introduced to the pads 133 and 134 may be discharged to the ground voltage $V_{SS}$ line.

The description of FIG. 11 is only a schematic illustration of an example applicable to the display module 10, and the ESD protection circuit 132 of various structures may be applicable in addition to the above example.

Figure 12:
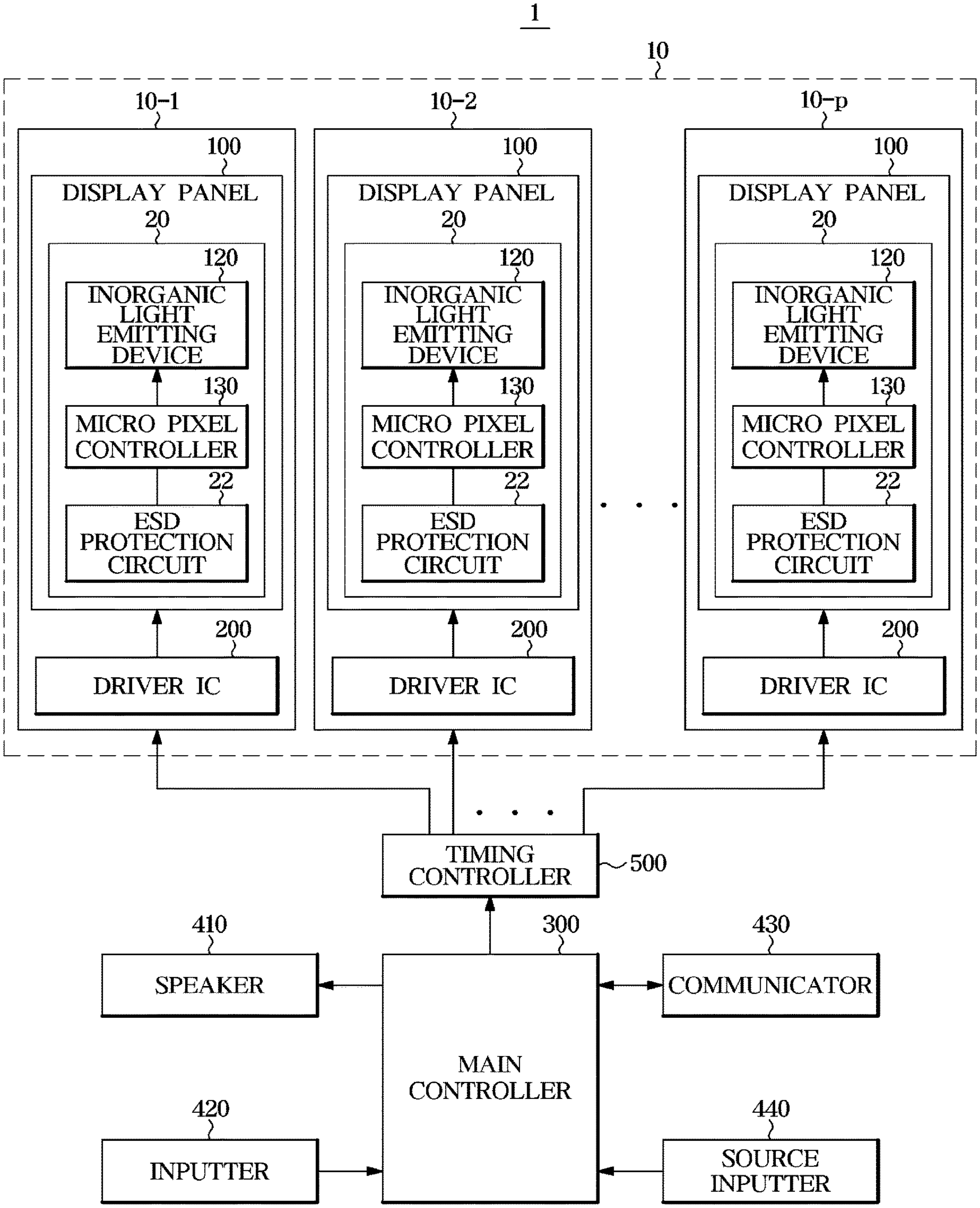
FIG. 12 is a control block diagram illustrating an example in which inorganic light emitting devices are disposed on a module substrate in units of pixel packages, in a display module according to an embodiment.
Figure 13:
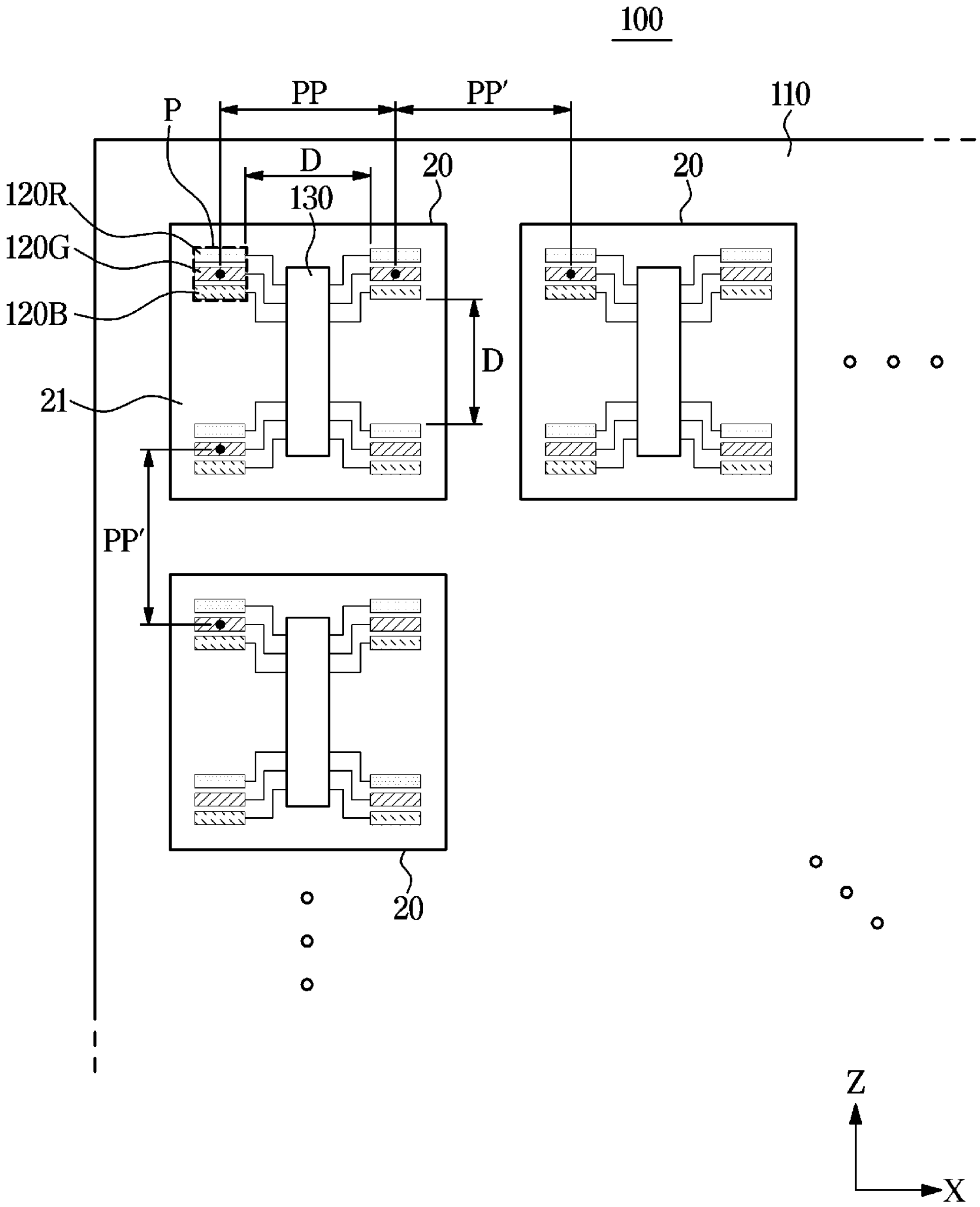
FIG. 13 is a plan view illustrating a structure in which inorganic light emitting devices are disposed on a module substrate in units of pixel packages, in a display module according to an embodiment.

FIG. 12 is a control block diagram illustrating an example in which inorganic light emitting devices are disposed on a module substrate in units of pixel packages, in a display module according to an embodiment, and FIG. 13 is a plan view illustrating a structure in which inorganic light emitting devices are disposed on a module substrate in units of pixel packages, in a display module according to an embodiment.

Referring to FIGS. 12 and 13, the inorganic light emitting device 120 and the micro-pixel controller 130 provided in the display panel 100 are not directly mounted on the module substrate 110, but are mounted on a package substrate 21 so that a certain number of inorganic light emitting devices 120 and a micro-pixel controller 130 form a single pixel package 20, and a plurality of the pixel packages 20 are mounted on the module substrate 110, thereby forming the display panel 100.

In addition, the pixel package 20 may further include an ESD protection circuit 22 for protecting devices in the pixel package 20 from electrostatic discharge.

For example, when the inorganic light emitting devices 120 and the micro-pixel controller 130 are provided in a single package, the reliability of the inspection of the pixel circuit or the inspection of the inorganic light emitting device may be improved, and rapid inspection may be performed because only packages determined as good quality are mounted on the module substrate 110, and replacement of defective products may be facilitated.

Referring to FIG. 13, the pixel package 20 may include a package substrate 21 and a plurality of pixels P disposed on an upper surface of the package substrate 21. In the example shown in FIG. 13, a case in which four pixels are provided in a single pixel package 20 is illustrated. Assuming that three sub-pixels are included for each unit pixel, the single pixel package 100 may be provided with twelve inorganic light emitting devices 120.

In the example, when a single micro-pixel controller 130 controls a single pixel package 20, the micro-pixel controller 130 may include pixel circuits 131P for controlling the twelve inorganic light emitting devices 120.

However, embodiments of the display module 10 are not limited thereto, and two or more micro-pixel controllers 130 may be disposed in a single micro-pixel package 20. In the following embodiment, a case in which a single micro-pixel controller 130 is disposed will be described.

Even when the micro-pixel controller 130 is disposed in the pixel package 20, the micro-pixel controller 130 may be disposed in a space in which the inorganic light emitting device 120 is not disposed. To this end, the top side of the micro-pixel controller 130 may have a short side, of which the length is shorter than a distance D between the boundaries of pixels P adjacent to each other.

The pixel package 20 may be arranged in consideration of the overall pixel arrangement and a pixel pitch of the display module 10. For example, when the display module 10 has a pixel arrangement of an M×N matrix, and a single pixel package 20 has pixels arranged according to an M×N array, M/m pixel packages 20 may be arranged in the column direction, that is, the Z axis direction, and N/n pixel packages 20 may be arranged in the row direction, that is, the X-axis direction.

With respect to a single pixel in the pixel package 20, pixel spacing PP between the single pixel and pixels adjacent to the single pixel in the front, rear, left, and right side directions may be the same. In addition, a plurality of pixel spacing PP may be substantially equal to each other even in a unit of the display module 10. In embodiments, values that are described as the same may include not only a case in which the corresponding values are exactly the same but also a case in which the corresponding values are within a predetermined error range each other.

The arrangement and interval of the pixel packages 20 may be determined such that even when two pixels P adjacent to each other are arranged in different pixel packages 20, a pixel spacing PP' between the two pixels may be the same as a pixel spacing PP in a single pixel package 20.

FIGS. 14 to 17 are diagrams illustrating examples of an ESD circuit disposed inside a pixel package, in a display module according to an embodiment.

Figure 14:
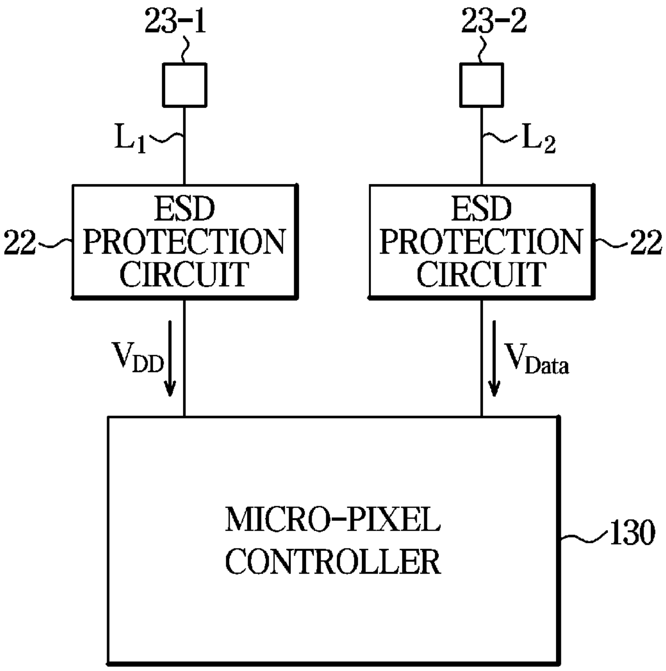
FIGS. 14 to 17 are diagrams illustrating examples of an ESD circuit disposed inside a pixel package, in a display module according to an embodiment.

Referring to FIG. 14, a power voltage $V_{DD}$ supplied from the outside may be input to a first input pad 23-1 provided in the pixel package 20, and a data voltage $V_{Data}$ transmitted from the driver IC 200 may be input to a second input pad 23-2 provided in the pixel package 20.

The first input pad 23-1 may be connected to the micro-pixel controller 130 through a first voltage line L1, and the power voltage $V_{DD}$ input to the first input pad 23-1 may be transmitted to the micro-pixel controller 130 through the first voltage line L1.

The second input pad 23-2 may be connected to the micro-pixel controller 130 through a second voltage line L2, and the power voltage $V_{DD}$ input to the second input pad 133-2 may be transmitted to the micro-pixel controller 130 through the second voltage line L2.

The first voltage line L1 connecting the first input pad 23-1 to the micro-pixel controller 130 may be connected to an ESD protection circuit 22 that discharges static electricity introduced through the first input pad 23-1 to a ground voltage $V_{SS}$ line.

The second voltage line L2 connecting the second input pad 23-2 to the micro-pixel controller 130 may be connected to an ESD protection circuit 22 that discharges static electricity introduced through the second input pad 23-2 to the ground voltage $V_{SS}$ line.

In the example, when a single pixel package 20 includes pixels of a 2×2 array, the power voltages to be applied to the pixels arranged in two columns may be received through a single line, and the data voltages to be applied to the pixels arranged in the two columns may also be received through a single line. That is, the number of lines required for the power voltages and the number of lines required for the data voltages may be reduced by half.

In addition, as the number of lines required for the power voltages and the number of lines required for the data voltages decrease, the number of input pads provided in the pixel package 20 may also decrease.

As the number of input pads decreases, the number of ESD protection circuits 22 for protecting devices from discharge of static electricity introduced from the input pads may also be reduced.

In addition, since the inorganic light emitting device 120 is mounted on the pixel package 20 itself, an output pad for outputting a drive current to be supplied to the inorganic light emitting device 120 is not directly disposed on the package substrate 21. Accordingly, the number of the output pads may be reduced, and accordingly, the number of ESD protection circuits 22 for protecting devices from static electricity introduced from the output pads may also be reduced.

Moreover, when the power voltage and the data voltage are transmitted between the micro-pixel controllers 130 disposed adjacent to each other, an output pad for outputting the power voltage and the data voltage to the next pixel package 20 adjacent in the column direction and an ESD protection circuit may be further disposed.

Figure 15:
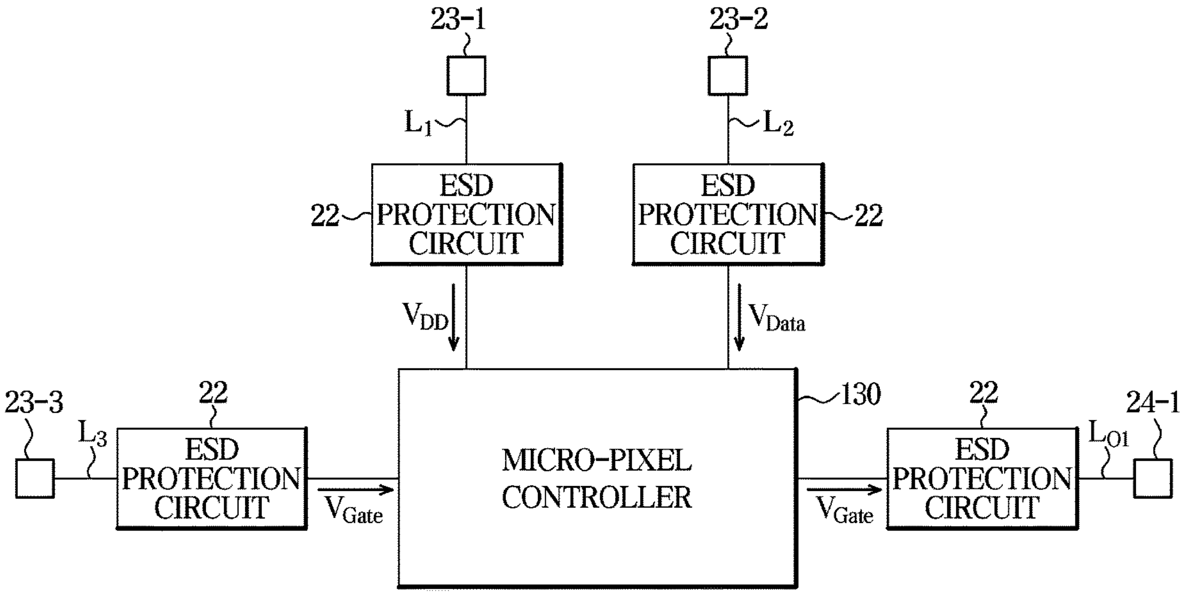

Referring to FIG. 15, the gate voltage $V_{Gate}$ may be input from the outside of the pixel package 20. To this end, the pixel package 20 may be provided with a third input pad 23-3 to which the gate voltage $V_{Gate}$ is input.

The gate voltage may be output from the gate driver 210 or transmitted from another micro-pixel controller 130 adjacent in the row direction.

The third input pad 133-3 may be connected to the micro-pixel controller 130 through a third voltage line L3, and a gate voltage $V_{Gate}$ input to the third input pad 23-3 may be transmitted to the micro-pixel controller 130 through the third voltage line L3.

The third voltage line L3 connecting the third input pad 23-3 to the micro-pixel controller 130 may be connected to an ESD protection circuits 22 that discharges static electricity introduced through the third input pad 23-3 to a ground voltage $V_{SS}$ line.

As described above, the micro-pixel controller 130 may transmit the input gate voltage to the next micro-pixel controller 130 adjacent in the row direction. To this end, the pixel package 20 may be provided with a first output pad 24-1 from which a gate voltage is output.

A first output line LO-1 connecting the first output pad 24-1 to the micro-pixel controller 130 may be connected to an ESD protection circuit that discharges static electricity introduced through the first output pad 24-1 to a ground voltage $V_{SS}$ line. That is, the ESD protection circuit may be disposed between the micro-pixel controller 130 and the first output pad 24-1 and connected to the micro-pixel controller 130 and the first output pad 24-1 through the first output line LO-1.

For example, when a single pixel package includes pixels of a 2×2 array, gate voltages to be applied to pixels arranged in two rows may be received through a single line. That is, the number of lines required for the gate voltages may be reduced by half.

In addition, as the number of lines required for the gate voltages decrease, the number of input pads provided in the pixel package 20 may also decrease. As the number of input pads decreases, the number of ESD protection circuits 22 required for the input pads may also be reduced.

Alternatively or additionally, the gate driver 210 may be omitted, and a gate voltage may be generated in the micro-pixel controller 130. In this case, a timing control signal transmitted from the timing controller 500 may be input to the pixel package 20, and a gate voltage generating circuit in the micro-pixel controller 130 may generates a gate voltage based on the input timing control signal.

Figure 16:
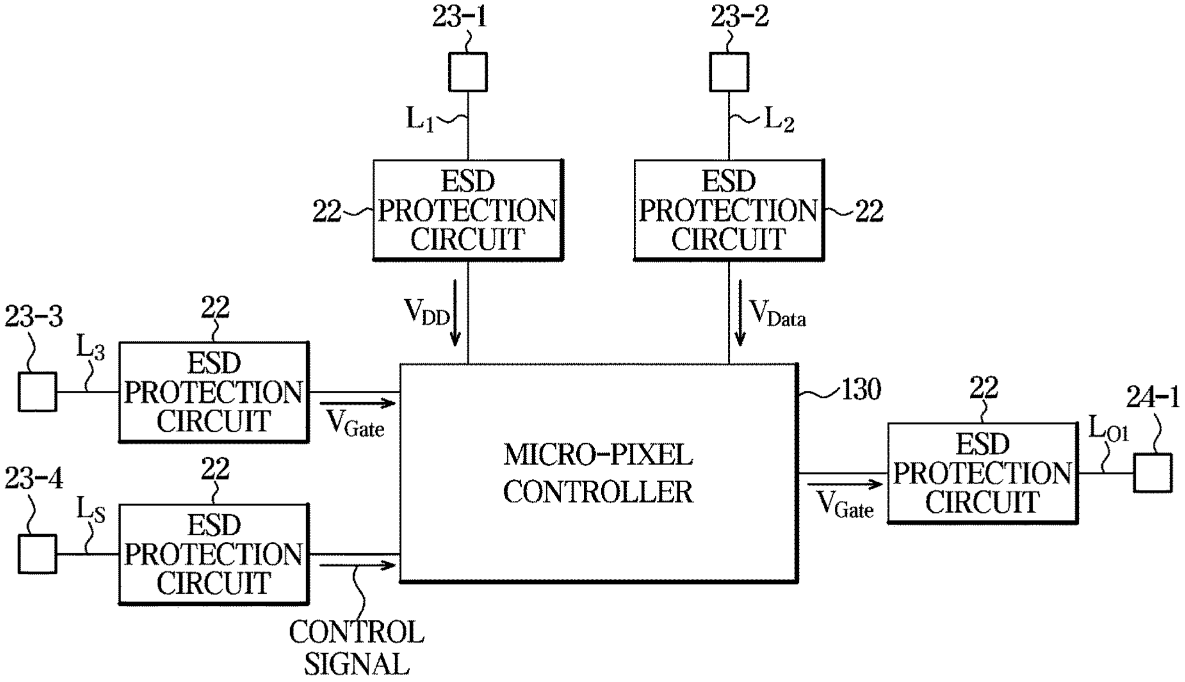

Referring to FIG. 16, the pixel package 20 may be provided with a fourth input pad 23-4 to which a control signal is input. The fourth input pad 23-4 may be connected to the micro-pixel controller 130 through a control signal line LS, and the control signal input to the fourth input pad 23-4 may be transmitted to the micro-pixel controller 130 through the control signal line LS.

The control signal line LS connecting the fourth input pad 23-4 to the micro-pixel controller 130 may be connected to an ESD protection circuit 22 that discharges static electricity introduced through the fourth input pad 23-4 to a ground voltage $V_{SS}$ line.

Figure 17:
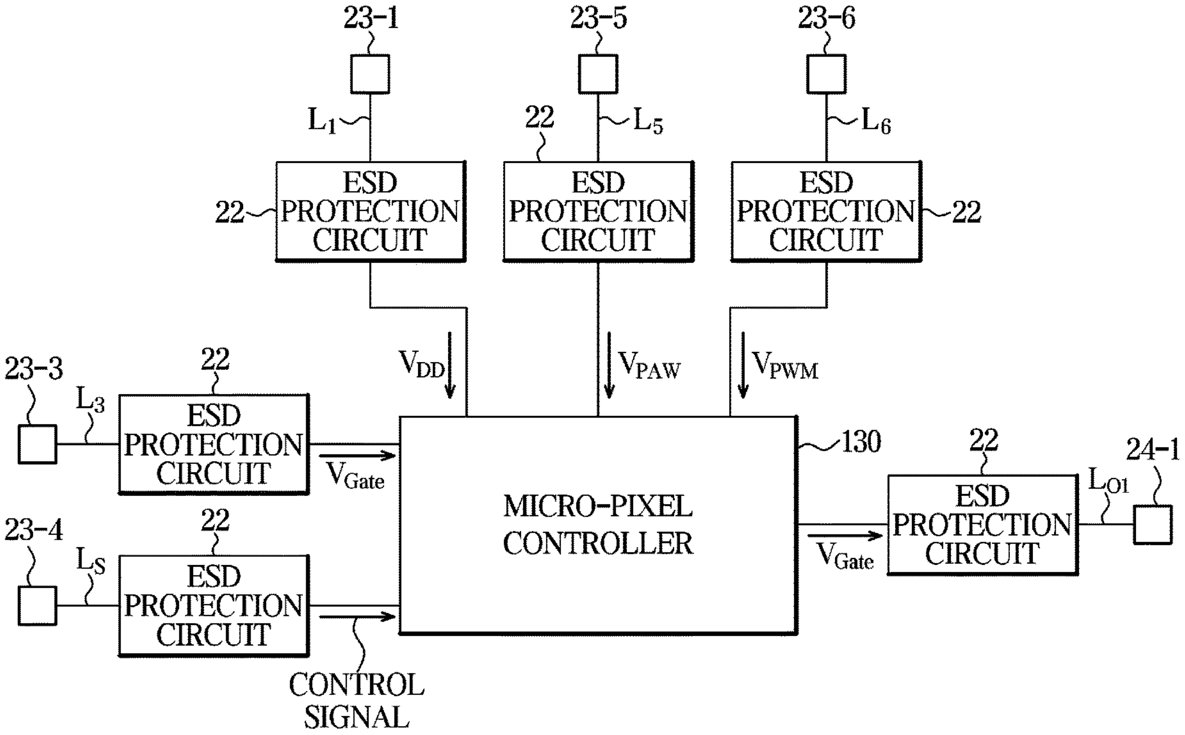

When both of the pulse width and the amplitude of the drive current are controlled for image implementation, the data voltage may include a PAM voltage and a PWM voltage. Accordingly, as shown in FIG. 17, the pixel package 20 may be provided with a fifth input pad 23-5 to which the PAM voltage $V_{PAM}$ is input and a sixth input pad 23-6 to which the PWM voltage $V_{PWM}$ is input.

The fifth input pad 23-5 may be connected to the micro-pixel controller 130 through a fifth voltage line L5, and the PAM voltage $V_{PAM}$ input to the fifth input pad 23-5 may be transmitted to the micro-pixel controller 130 through the fifth voltage line L5.

The sixth input pad 23-6 may be connected to the micro-pixel controller 130 through a sixth voltage line L6, and the PWM voltage $V_{PWM}$ input to the sixth input pad 23-6 may be transmitted to the micro-pixel controller 130 through the sixth voltage line L6.

The fifth voltage line L5 connecting the fifth input pad 23-5 to the micro-pixel controller 130 may be connected to an ESD protection circuit 22 that discharges static electricity introduced through the fifth input pad 23-5 to a ground voltage $V_{SS}$ line.

The sixth voltage line L6 connecting the sixth input pad 23-6 to the micro-pixel controller 130 may be connected to an ESD protection circuit 22 that discharges static electricity introduced through the sixth input pad 23-6 to a ground voltage $V_{SS}$ line.

In the above-described embodiments, an example in which the ESD protection circuit is disposed in the micro-pixel controller 130 and an example in which the ESD protection circuit is disposed in the pixel package 20 have been described. However, the one or more embodiments are not limited thereto, and ESD protection circuits may be provided in other locations or other manners. For example, the ESD protection circuits may be disposed in the micro-pixel controller 130 and the pixel package 20 in a distributed manner.

In addition, an ESD protection circuit may be disposed on the module substrate 110.

The one or more embodiments of the disclosure are shown and described above. However, the one or more embodiments are not limited to the above examples, and may be variously configured. That is, the embodiments of the disclosure may be changed or modified without departing from the inventive concept of the disclosure. The above-described embodiments are provided to realize the technical spirit of the disclosure, and various modifications, substitutions, improvements and equivalents thereof may be made by one of ordinary skill in the art without departing from the scope of the disclosure. Therefore, the above-described embodiments of the disclosure are not intended to limit the disclosure. It should be understood that the scope of the appended claims also includes other embodiments.

What is claimed is:

1. A display module comprising:

a module substrate;

a plurality of pixels provided on the module substrate; and a plurality of micro-pixel controllers provided in spaces between the plurality of pixels and configured to supply drive currents to at least two pixels among the plurality of pixels, wherein at least one micro-pixel controller of the plurality of micro-pixel controllers comprises:

an integrated circuit (IC) substrate;

a first input pad to which a power voltage is input;

a second input pad to which a data voltage is input;

a plurality of pixel circuits configured to be mounted on the IC substrate and output the drive currents to be supplied to the plurality of pixels, wherein each of the plurality of pixel circuits includes a plurality of sub-pixel circuits including a red sub-pixel circuit that outputs a drive current supplied to a red sub-pixel, a green sub-pixel circuit that outputs a drive current supplied to a green sub-pixel, and a blue sub-pixel circuit that outputs a drive current supplied to a blue sub-pixel;

a control circuit configured to distribute the power voltage input to the first input pad and the data voltage input to the second input pad to at least one sub-pixel circuit of the plurality of sub-pixel circuits in each of the plurality of pixel circuits;

a first electrostatic discharge (ESD) protection circuit connected between the first input pad and the control circuit through a first voltage line configured to transmit, to the control circuit, the power voltage input to the first input pad;

a second ESD protection circuit connected between the second input pad and the control circuit through a second voltage line configured to transmit, to the control circuit, the data voltage input to the second input pad;

a plurality of output pads from which the drive currents to be supplied to a plurality of sub-pixels including the red sub-pixel, the green sub-pixel and the blue sub-pixel in each of the plurality of pixels are output; and a plurality of ESD protection circuits provided on a plurality of output lines connecting the plurality of output pads to the plurality of sub-pixel circuits in each of the plurality of pixel circuits.

2. The display module of claim 1, wherein the at least one micro-pixel controller of the plurality of micro-pixel controllers further comprises:

a third input pad to which a gate voltage is input; and a third ESD protection circuit connected to the third input pad and the control circuit through a third voltage line, and configured to transmit, to the control circuit, the gate voltage input to the third input pad.

3. The display module of claim 2, wherein the at least one micro-pixel controller of the plurality of micro-pixel controllers is further configured to output the drive currents supplied to pixels provided in an m×n array among the plurality of pixels, and m and n are integers greater than or equal to 2.

4. The display module of claim 3, wherein the first ESD protection circuit connected to the first voltage line comprises a number of ESD protection circuits that is less than n.

5. The display module of claim 3, wherein the second ESD protection circuit connected to the second voltage line comprises a number of ESD protection circuits that is less than n.

6. The display module of claim 3, wherein the third ESD protection circuit connected to the third voltage line comprises a number of ESD protection circuits that is less than m.

7. The display module of claim 1, wherein the at least one micro-pixel controller of the plurality of micro-pixel controllers further comprises:

a fourth input pad to which a control signal from a timing controller is input; and a fourth ESD protection circuit connected to the fourth input pad and the control circuit through a control signal line and configured to transmit, to the control circuit, the control signal input to the fourth input pad.

8. The display module of claim 1, wherein the second input pad comprises a fifth input pad to which a pulse amplitude modulation (PAM) voltage is input and a sixth input pad to which a pulse width modulation (PWM) voltage is input, wherein the second voltage line comprises a fifth voltage line for transmitting the PAM voltage to the control circuit and a sixth voltage line for transmitting the PWM voltage to the control circuit, and wherein the second ESD protection circuit connected to the second voltage line comprises a fifth ESD protection circuit connected to the fifth voltage line and a sixth ESD protection circuit connected to the sixth voltage line.

9. A display module comprising:

a module substrate; and a plurality of pixel packages provided on the module substrate, wherein at least one pixel package of the plurality of pixel packages comprises:

a package substrate;

a plurality of pixels provided on the package substrate;

a micro-pixel controller provided in a space between the plurality of pixels and configured to supply drive currents to the plurality of pixels;

a first input pad to which a power voltage is input;

a second input pad to which a data voltage is input;

a first electrostatic discharge (ESD) protection circuit connected between the first input pad and the micro-pixel controller through a first voltage line configured to transmit, to the micro-pixel controller, the power voltage input to the first input pad; and a second ESD protection circuit connected between the second input pad and the micro-pixel controller through a second voltage line configured to transmit, to the micro-pixel controller, the data voltage input to the second input pad, and wherein the micro-pixel controller comprises:

an integrated circuit (IC) substrate;

a plurality of pixel circuits configured to be mounted on the IC substrate and output the drive currents to be supplied to the plurality of pixels, wherein each of the plurality of pixel circuits includes a plurality of sub-pixel circuits including a red sub-pixel circuit that outputs a drive current supplied to a red sub-pixel, a green sub-pixel circuit that outputs a drive current supplied to a green sub-pixel, and a blue sub-pixel circuit that outputs a drive current supplied to a blue sub-pixel;

a control circuit configured to distribute the power voltage input to the first input pad and the data voltage input to the second input pad to at least one sub-pixel circuit of the plurality of sub-pixel circuits in each of the plurality of pixel circuits;

a plurality of output pads from which the drive currents to be supplied to a plurality of sub-pixels including the red sub-pixel, the green sub-pixel and the blue sub-pixel in each of the plurality of pixels are output; and a plurality of ESD protection circuits provided on a plurality of output lines connecting the plurality of output pads to the plurality of sub-pixel circuits in each of the plurality of pixel circuits.

10. The display module of claim 9, wherein the at least one pixel package of the plurality of pixel packages further comprises:

a third input pad to which a gate voltage is input; and a third ESD protection circuit connected to the third input pad and the micro-pixel controller through a third voltage line and configured to transmit, to the micro-pixel controller, the gate voltage, input to the third input pad.

11. The display module of claim 10, wherein the plurality of pixels are provided on the package substrate in an m×n array, and m and n are integers greater than or equal to 2, wherein each of the first ESD protection circuit connected to the first voltage line and the second ESD protection circuit connected to the second voltage line comprises a number of ESD protection circuits that is less than n, and wherein the third ESD protection circuit connected to the third voltage line comprises a number of ESD protection circuits that is less than m.

12. A display apparatus comprising:

a plurality of display modules;

at least one driver integrated chip (IC) configured to drive the plurality of display modules; and a timing controller configured to control the plurality of display modules, wherein at least one display module of the plurality of display modules comprises:

a module substrate; and a plurality of pixel packages provided on the module substrate, wherein at least one pixel package of the plurality of pixel packages comprises:

a package substrate;

a plurality of pixels provided on the package substrate;

a micro-pixel controller provided in a space between the plurality of pixels and configured to supply drive currents to the plurality of pixels; a first input pad to which a power voltage is input;

a second input pad to which a data voltage is input;

a first electrostatic discharge (ESD) protection circuit connected between the first input pad and the micro-pixel controller through a first voltage line configured to transmit, to the micro-pixel controller, the power voltage input to the first input pad; and a second ESD protection circuit connected between the second input pad and the micro-pixel controller through a second voltage line configured to transmit, to the micro-pixel controller, the data voltage input to the second input pad, and wherein the micro-pixel controller comprises:

an integrated circuit (IC) substrate;

a plurality of pixel circuits configured to be mounted on the IC substrate and output the drive currents to be supplied to the plurality of pixels, wherein each of the plurality of pixel circuits includes a plurality of sub-pixel circuits including a red sub-pixel circuit that outputs a drive current supplied to a red sub-pixel, a green sub-pixel circuit that outputs a drive current supplied to a green sub-pixel, and a blue sub-pixel circuit that outputs a drive current supplied to a blue sub-pixel;

a control circuit configured to distribute the power voltage input to the first input pad and the data voltage input to the second input pad to at least one sub-pixel circuit of the plurality of sub-pixel circuits in each of the plurality of pixel circuits;

a plurality of output pads from which the drive currents to be supplied to a plurality of sub-pixels including the red sub-pixel, the green sub-pixel and the blue sub-pixel in each of the plurality of pixels are output; and a plurality of ESD protection circuits provided on a plurality of output lines connecting the plurality of output pads to the plurality of sub-pixel circuits in each of the plurality of pixel circuits.

13. The display apparatus of claim 12, wherein the at least one pixel package of the plurality of pixel packages further comprises:

a third input pad to which a gate voltage is input; and a third ESD protection circuit connected to the third input pad and the micro-pixel controller through a third voltage line and configured to transmit, to the micro-pixel controller, the gate voltage input to the third input pad.

14. The display apparatus of claim 13, wherein the plurality of pixels are provided on the package substrate in an m×n array, and m and n are integers greater than or equal to 2, wherein each of the first ESD protection circuit connected to the first voltage line and the second ESD protection circuit connected to the second voltage line comprises a number of ESD protection circuits that less than n, and wherein the third ESD protection circuit connected to the third voltage line comprises a number of ESD protection circuits that is less than m.

* * * * *